US008630640B2

(12) United States Patent
Das et al.

(10) Patent No.: US 8,630,640 B2
(45) Date of Patent: Jan. 14, 2014

(54) REFINING FEMTOCELL COVERAGE INFORMATION WITH BEACON TRANSMITTERS

(75) Inventors: Soumya Das, San Diego, CA (US); Samir S. Soliman, San Diego, CA (US)

(73) Assignee: QUALCOMM Incororated, San Diego, CA (US)

( * ) Notice: Subject to any disclaimer, the term of this patent is extended or adjusted under 35 U.S.C. 154(b) by 243 days.

(21) Appl. No.: 12/883,532

(22) Filed: Sep. 16, 2010

(65) Prior Publication Data

US 2012/0071160 A1 Mar. 22, 2012

(51) Int. Cl.
*H04W 4/00* (2009.01)

(52) U.S. Cl.
USPC ........... 455/434; 455/436; 455/438; 455/444; 455/443; 455/422.1

(58) Field of Classification Search
USPC ................. 455/436, 438, 445, 434, 444, 443, 455/422.1; 370/331
See application file for complete search history.

(56) References Cited

U.S. PATENT DOCUMENTS

| | | | | |
|---|---|---|---|---|
| 2008/0076398 A1* | 3/2008 | Mate et al. | ................ | 455/414.2 |
| 2008/0132239 A1* | 6/2008 | Khetawat et al. | ............ | 455/438 |
| 2009/0082020 A1* | 3/2009 | Ch'ng et al. | ............... | 455/435.3 |
| 2009/0129336 A1* | 5/2009 | Osborn | ......................... | 370/331 |
| 2009/0156213 A1* | 6/2009 | Spinelli et al. | ................ | 455/436 |
| 2009/0219888 A1* | 9/2009 | Chen et al. | ................... | 370/331 |
| 2009/0247170 A1* | 10/2009 | Balasubramanian et al. | | 455/445 |
| 2010/0029278 A1* | 2/2010 | Fang et al. | .................... | 455/436 |

FOREIGN PATENT DOCUMENTS

| | | |
|---|---|---|
| WO | WO2008030956 | 3/2008 |
| WO | WO2009120902 A1 | 10/2009 |

OTHER PUBLICATIONS

International Search Report and Written Opinion—PCT/US2011/051813—ISA/EPO—Dec. 27, 2011.
Tiedemann E G: "Femtocell Activities in 3GPP2 TSG-C", 3RD Generation Partnership Project (3GPP) ; Technicalspecification Group (TSG) Radio Access Network (RAN) ; Working Group 2 (WG2) , XX, XX Mar. 31, 2009, pp. 1-18, XP002599307, Retrieved from the Internet : URL:fftp://ftp.3gpp2.org/TSGX/Working/2009 /2009-03-New%200rleans/A11%20TSG%20Femto%20Discussion/XS1-20090331-004-TSG-C Femto%200 Overview-090330.p [retrieved on Sep. 2, 2010].

* cited by examiner

*Primary Examiner* — David Q Nguyen
(74) *Attorney, Agent, or Firm* — Jeffrey D. Jacobs

(57) ABSTRACT

Systems, methods, devices, and computer program products are described for refinement of femtocell coverage area information in a wireless communication system, particularly in context of a femto-proxy architecture. Zones may be defined within a femtocell coverage area using beacon sources, and a zone map of zone signatures may be defined for each zone of the femtocell coverage area, according to macro signatures detected in those zones. The zone map can be used, by access terminals, the femto-proxy system, and/or the macro network, to provide functionality, including reduced power level femtocell discovery and association, enhanced network planning, improved femtocell troubleshooting, etc.

41 Claims, 14 Drawing Sheets

REFINING FEMTOCELL COVERAGE INFORMATION WITH BEACON TRANSMITTERS

BACKGROUND

The disclosure relates generally to network communication and, more particularly, to using out of band communications to enhance femtocell operations, such as to increase granularity of information and functionality within a femtocell coverage area.

Information communication provided by various forms of networks is in wide use in the world today. Networks having multiple nodes in communication using wireless and wireline links are used, for example, to carry voice and/or data. The nodes of such networks may be computers, personal digital assistants (PDAs), phones, servers, routers, switches, multiplexers, modems, radios, access points, base stations, etc. Many client device nodes (also referred to as user equipment (UE) or access terminals (ATs)), such as cellular phones, PDAs, laptop computers, etc. are mobile and thus may connect with a network through a number of different interfaces.

Mobile client devices may connect with a network wirelessly via a nearest base station, access point, wireless router, etc. (collectively referred to herein as access points). A mobile client device may remain within the service area of such an access point for a relatively long period of time (referred to as being "camped on" the access point) or may travel relatively rapidly through access point service areas, with cellular handoff or reselection techniques being used for maintaining a communication session or for idle mode operation as association with access points is changed.

Issues with respect to available spectrum, bandwidth, capacity, etc. may result in a network interface being unavailable or inadequate between a particular client device and access point. Moreover, issues with respect to wireless signal propagation, such as shadowing, multipath fading, interference, etc., may result in a network interface being unavailable or inadequate between a particular client device and access point. Cellular networks have employed the use of various cell types, such as macrocells, microcells, picocells, and femtocells, to provide desired bandwidth, capacity, and wireless communication coverage within service areas. For example, the use of femtocells is often desirable to provide wireless communication in areas of poor network coverage (e.g., inside of buildings), to provide increased network capacity, to utilize broadband network capacity for backhaul, etc.

Mobile client devices generally operate using an internal power supply, such as a small battery, to facilitate their highly mobile operation. Typical operation to provide femtocell system selection, however, has an appreciable impact upon the power utilized by a mobile client device. Searching for available femtocells within range, negotiating links, etc. in typical use scenarios will often result in a reduction of the mobile client device standby time operation available from the internal power supply by approximately 10%. For example, an internal power supply may be appreciably drained as a result of a mobile client device continuing to search for femtocells whether or not appropriate femtocells are in range of the mobile client device.

SUMMARY

The present disclosure is directed to systems and methods that utilize out of band (OOB) communications to enhance femtocell operations. Embodiments operate in the context of a femto-proxy system having a femtocell and an OOB femto-proxy. For example, the OOB femto-proxy may use Bluetooth™ to communicate with access terminals (ATs) registered to the femto-proxy system. The femtocell provides a coverage area (e.g., over a user premises) in which registered ATs can "attach" to the femtocell, so as to interact with communications services of a Wireless Wide Area Network (WWAN) via the femtocell.

Typically, a number of beacon sources (e.g., in addition to the femto-proxy system) may be placed throughout the femtocell coverage area, each configured to transmit a beacon signal with an identifier. These beacon sources effectively partition the femtocell coverage area into zones. For example, when an AT is in a location within the femtocell coverage area, the AT will detect a certain beacon signature according to the positions of the beacon sources with respect to the location of the AT. The AT may also detect a macro signature from that location due to macro signals being detected from one or more neighboring macro cells. The macro signatures can be associated with the zones (e.g., with the beacon signatures) to generate zone signatures as part of a zone map.

The zone map can be used by the femto-proxy system and/or by the ATs to provide various types of functionality. For example, ATs can use the zone signature to detect (e.g., via their OOB transceiver) proximity to the home femtocell. The ATs can thereby wait to begin scanning for the femtocell until they are in proximity. In another example, the femto-proxy system can use the zone map to provide higher granularity information about network conditions to the macro network (e.g., an interference map) than would otherwise be available just using the network listen functionality of the femtocell.

An exemplary method for femtocell discovery includes: detecting a number of macro signals at an access terminal, each macro signal associated with a macro cell corresponding to a macro identifier, the macro cells being part of a macro communications network configured to provide communications services to the access terminal; calculating a present macro signature using the access terminal according to the detected macro signals; determining whether the present macro signature correlates with one of a number of zone signatures stored locally in a zone map, each zone signature representing a macro signature previously associated with one of a number of zones of a femtocell coverage area provided by a femtocell; and initiating detection of the femtocell when the present macro signature correlates with one of the zone signatures.

Embodiments of such a method may include initiating detection of the femtocell when the present macro signature correlates with one of the zone signatures by activating an out-of-band subsystem in the access terminal to detect an out-of-band femto-proxy when the present macro signature correlates with one of the zone signatures, the out-of-band femto-proxy being integrated with the femtocell as part of a femto-proxy system. Embodiments of such a method may also include: initiating a scan at the access terminal to detect the femtocell of the femto-proxy system after the out-of-band femto-proxy is detected by the access terminal; and communicatively coupling the access terminal with the femtocell when the femtocell is detected by the access terminal. Alternatively, embodiments of such a method may include initiating detection of the femtocell when the present macro signature correlates with one of the zone signatures by activating a WWAN subsystem in the access terminal to detect the femtocell when the present macro signature correlates with one of the zone signatures.

Also or alternatively, embodiments of such a method may include: communicatively coupling the access terminal with the femtocell with the access terminal located in the femtocell coverage area; while the access terminal is communicatively coupled with the femtocell and located in the femtocell coverage area: calculating a present beacon signature using the access terminal according to a combination of detected beacon signals originating from proximately located beacon sources; determining a zone in which the access terminal is located, the zone being one of the zones of the femtocell coverage area corresponding to the present beacon signature; and generating a zone signature by associating the present macro signature with the zone of the femtocell coverage area corresponding to the present beacon signature; and updating the zone map stored locally at the access terminal (or downloaded from the femto-proxy system) with the generated zone signature. At least one of the beacon signals may be a Bluetooth signal and/or at least one of the beacon sources may be an out-of-band femto-proxy.

Also or alternatively, embodiments of such a method may include: communicatively coupling the access terminal with the femtocell; downloading at least one zone signature from the femtocell to the access terminal; and updating the zone map stored locally at the access terminal with the downloaded zone signature. Also or alternatively, embodiments of such a method may include one or more of the following features: calculating the present macro signature using the access terminal according to the detected plurality of macro signals includes determining the macro identifier and a signal strength for each macro signal, the macro signature having a set of the macro identifiers ordered according to the respective signal strengths; an out-of-band subsystem is configured to communicate with an out-of-band femto-proxy via a Bluetooth communications link; or each macro cell is an intra-frequency, inter-frequency neighbor of the femtocell that is not a neighboring femtocell.

An exemplary access terminal for use in these environments and to implement certain of the functionality described herein includes: a data store including a zone map having a plurality of zone signatures, each representing a macro signature associated with one of a number of zones of a femtocell coverage area provided by a femtocell; a macro communications subsystem; and a femto communications subsystem. The macro communications subsystem is communicatively coupled with the data store and configured to: detect a number of macro signals, each macro signal associated with a macro cell corresponding to a macro identifier, the macro cells being part of a macro communications network; calculate a present macro signature according to the detected macro signals; and determine whether the present macro signature correlates with one of the zone signatures. The femto communications subsystem is communicatively coupled with the macro communications subsystem and configured to activate detection of the femtocell when the present macro signature correlates with one of the plurality of zone signatures; and become available for communications with the femtocell when the femtocell is detected.

According to some embodiments of such an access terminal, the femto communications subsystem is configured to activate detection of the femto-proxy system when the present macro signature correlates with one of the plurality of zone signatures by initiating a scan for the femtocell over a WWAN link when the present macro signature correlates with one of the plurality of zone signatures. According to other embodiments, the access terminal includes an out-of-band (OOB) communications subsystem and is configured to activate detection of the femtocell when the present macro signature correlates with one of the plurality of zone signatures by activating the OOB communications module to detect an OOB femto-proxy when the present macro signature correlates with one of the plurality of zone signatures, the out-of-band femto-proxy being integrated with the femtocell as part of a femto-proxy system.

Embodiments of such an access terminal also include a zone mapping subsystem, configured to: detect beacon signals originating from proximately located beacon sources when the femto communications subsystem is communicatively coupled with the femtocell while located in the femtocell coverage area; calculate a current beacon signature according to a combination of the detected beacon signals; determine a zone of the femtocell coverage area corresponding to the current beacon signature; receive the present macro signature from the macro communications subsystem; generate a zone signature by associating the received present macro signature with the zone of the femtocell coverage area corresponding to the current beacon signature; and update the zone map according to the generated zone signature. Alternatively, the zone mapping subsystem may be configured to: download at least one zone signature to the access terminal from a data store communicatively coupled with the femtocell; and update the zone map according to the downloaded zone signature.

Also or alternatively, the macro communications subsystem may be configured to calculate the present macro signature using the access terminal according to the detected plurality of macro signals by: determining the macro identifier and a signal strength for each macro signal, the macro signature comprising a set of the macro identifiers ordered according to the respective signal strengths.

An exemplary processor for femtocell discovery in an access terminal, such as the access terminal described above, includes a macro communications controller and a femto communications controller. The macro communications controller is configured to: detect a number of macro signals, each associated with a macro cell corresponding to a macro identifier, the macro cells being part of a macro communications network; calculate a present macro signature according to the detected macro signals; and determine whether the present macro signature correlates with one of a number of zone signatures stored in a zone map communicatively coupled with the local to the macro communications controller, each zone signature representing a macro signature associated with one of a number of zones of a femtocell coverage area provided by a femtocell. The femto communications controller is communicatively coupled with the macro communications controller, and configured to: activate detection of the femtocell when the present macro signature correlates with one of the plurality of zone signatures; and become available for communications with the femtocell when the femtocell is detected.

Such a processor may further include a zone mapping controller, configured to: detect beacon signals originating from proximately located beacon sources when the femto communications subsystem is communicatively coupled with the femtocell while located in the femtocell coverage area; calculate a current beacon signature according to a combination of the detected beacon signals; determine a zone of the femtocell coverage area corresponding to the current beacon signature; receive the present macro signature from the macro communications subsystem; generate a zone signature by associating the received present macro signature with the zone of the femtocell coverage area corresponding to the current beacon signature; and update the zone map according to the generated zone signature. Alternatively, the zone mapping controller may be configured to: download at least one zone signature from the femto-proxy system to the access terminal; and update the zone map according to the downloaded zone signature.

Also or alternatively, the macro communications controller may be configured to calculate the present macro signature using the access terminal according to the detected plurality of macro signals by: determining the macro identifier and a signal strength for each macro signal, the macro signature comprising a set of the macro identifiers ordered according to the respective signal strengths.

An exemplary computer program product resides on a processor-readable medium and includes processor-readable instructions, which, when executed, cause a processor to perform steps including: detecting a number of macro signals at an access terminal, each macro signal associated with a macro cell corresponding to a macro identifier, the macro cells being part of a macro communications network configured to provide communications services to the access terminal; calculating a present macro signature using the access terminal according to the detected macro signals; determining whether the present macro signature correlates with one of a plurality of zone signatures stored locally in a zone map, each zone signature representing a macro signature previously associated with one of a plurality of zones of a femtocell coverage area provided by a femtocell; and activating detection of the femtocell when the present macro signature correlates with one of the plurality of zone signatures.

Also or alternatively, the processor-readable instructions, when executed, may further cause a processor to perform steps including: communicatively coupling the access terminal with the femtocell with the access terminal located in the femtocell coverage area; while the access terminal is communicatively coupled with the femtocell and located in the femtocell coverage area: calculating a present beacon signature using the access terminal according to a combination of detected beacon signals originating from proximately located beacon sources; determining a zone in which the access terminal is located, the zone being one of the plurality of zones of the femtocell coverage area corresponding to the present beacon signature; generating a zone signature by associating the present macro signature with the zone of the femtocell coverage area corresponding to the present beacon signature; and updating the zone map stored locally at the access terminal with the generated zone signature. Also or alternatively, the processor-readable instructions, when executed, may further cause a processor to perform steps including: communicatively coupling the access terminal with the femtocell; downloading at least one zone signature to the access terminal from a data store communicatively coupled with the femtocell; and updating the zone map stored locally at the access terminal with the downloaded zone signature.

Also or alternatively, embodiments of such a computer program product may calculate the present macro signature using the access terminal according to the detected plurality of macro signals by: determining the macro identifier and a signal strength for each macro signal, the macro signature comprising a set of the macro identifiers ordered according to the respective signal strengths.

Another exemplary system for femtocell discovery includes: means for detecting a number of macro signals at an access terminal, each macro signal associated with a macro cell corresponding to a macro identifier, the macro cells being part of a macro communications network configured to provide communications services to the access terminal; means for calculating a present macro signature using the access terminal according to the detected macro signals; means for determining whether the present macro signature correlates with one of a number of zone signatures stored locally in a zone map, each zone signature representing a macro signature previously associated with one of a number of zones of a femtocell coverage area provided by a femtocell; and means for activating detection of the femtocell when the present macro signature correlates with one of the plurality of zone signatures.

Also or alternatively, embodiments of such a system may include: means for initiating a scan at the access terminal to detect the femtocell after an out-of-band femto-proxy is detected by the access terminal, the out-of-band femto-proxy being integrated with the femtocell as part of a femto-proxy system; and means for communicatively coupling the access terminal with the femtocell when the femtocell is detected by the access terminal.

Also or alternatively, embodiments of such a system may include: means for communicatively coupling the access terminal with the femtocell with the access terminal located in the femtocell coverage area; while the access terminal is communicatively coupled with the femtocell and located in the femtocell coverage area: means for calculating a present beacon signature using the access terminal according to a combination of detected beacon signals originating from proximately located beacon sources; means for determining a zone in which the access terminal is located, the zone being one of the plurality of zones of the femtocell coverage area corresponding to the present beacon signature; means for generating a zone signature by associating the present macro signature with the zone of the femtocell coverage area corresponding to the present beacon signature; and means for updating the zone map stored locally at the access terminal with the generated zone signature. Also or alternatively, embodiments of such a system may include: means for communicatively coupling the access terminal with the femtocell; means for downloading at least one zone signature to the access terminal from a data store communicatively coupled with the femtocell; and means for updating the zone map stored locally at the access terminal with the downloaded zone signature.

Also or alternatively, the means for calculating the present macro signature using the access terminal according to the detected plurality of macro signals may include: means for determining the macro identifier and a signal strength for each macro signal, the macro signature comprising a set of the macro identifiers ordered according to the respective signal strengths.

As can be appreciated from the foregoing, operation according to embodiments increases the granularity of femtocell coverage area information. The higher granularity information can provide functionality, including reduced power level femtocell discovery and association, enhanced network planning, improved femtocell troubleshooting, etc.

The foregoing has outlined rather broadly the features and technical advantages of embodiments of the present disclosure in order that the detailed description that follows may be better understood. Additional features and advantages will be described hereinafter. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the appended claims. The novel features which are believed to be characteristic of the concepts disclosed herein, both as to their organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the claims.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Refinement of femtocell coverage area information in a wireless communications system, particularly in context of a femto-proxy architecture, is described. Zones may be defined within a femtocell coverage area using beacon sources, and a zone map of zone signatures may be defined for each zone of the femtocell coverage area, according to macro signatures detected in those zones. The zone map can be used, by access terminals (ATs), the femto-proxy system, and/or the Wireless Wide Area Network (WWAN), to provide functionality, including reduced power level femtocell discovery and association, enhanced network planning, improved femtocell troubleshooting, etc.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure or claims. Various examples may omit, substitute, or add various procedures or components as appropriate. For instance, the methods described may be performed in an order different from that described, and various operations may be added, omitted, or combined. Also, features described with respect to certain examples may be combined in other examples.

Figure 1:
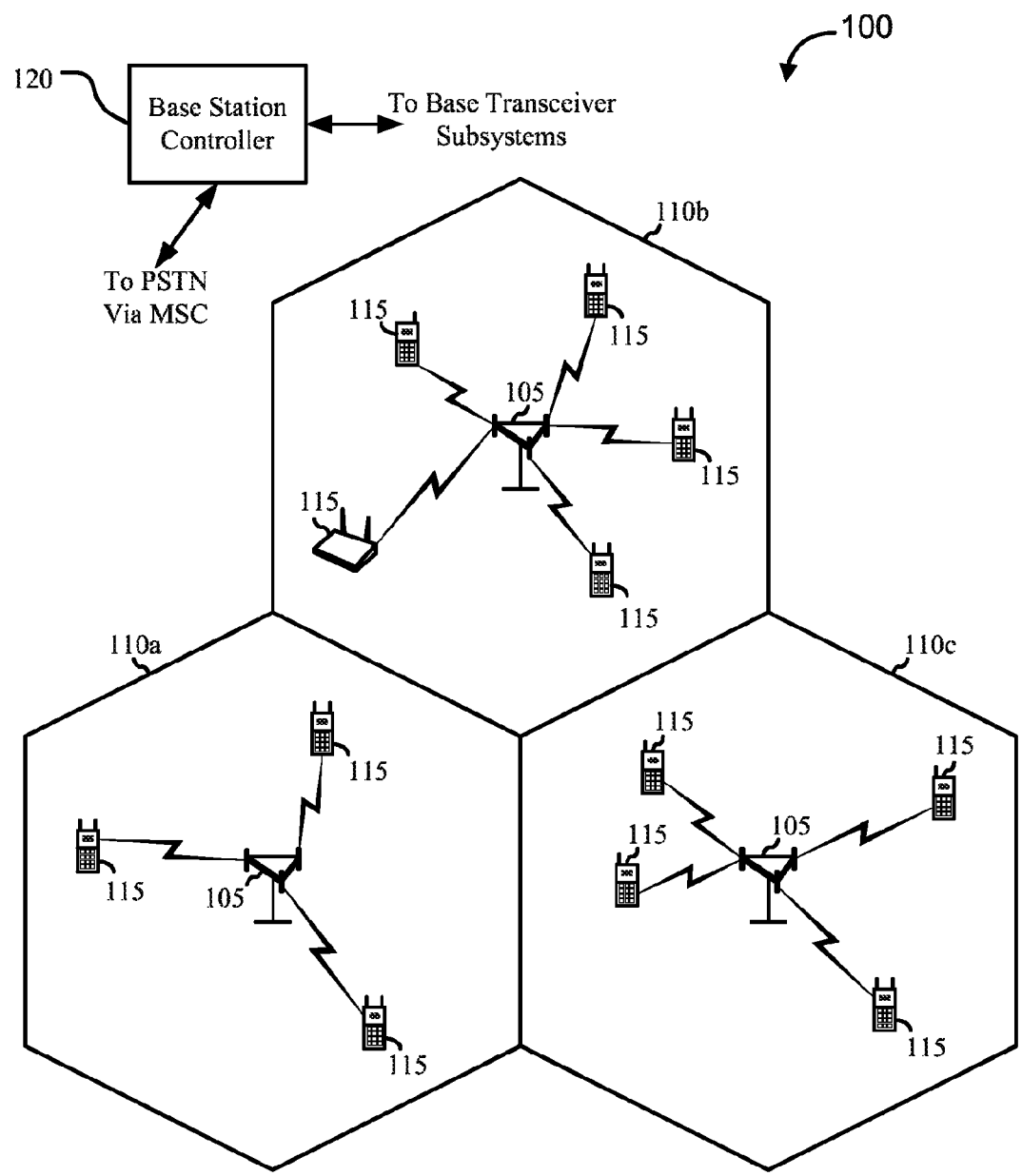
FIG. 1 shows a block diagram of a wireless communications system.

Referring first to FIG. 1, a block diagram illustrates an example of a wireless communications system 100. The system 100 includes base transceiver stations (BTSs) 105, disposed in cells 110, mobile access terminals 115 (ATs), and a base station controller (BSC) 120. It is worth noting that terminology like access terminal (AT), mobile station (MS), and others are used interchangeably herein and are not intended to imply a particular network topology or implementation. For example, while the "AT" terminology may typically be used for circuit switched (e.g., CDMA 1X) networks, and the "MS" terminology may typically be used for packet data service (e.g., EV-DO, HRPD) networks, the techniques described herein may be applied in the context of any of these or other networks.

The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc. The system 100 may be a multi-carrier LTE network capable of efficiently allocating network resources.

The BTSs 105 can wirelessly communicate with the ATs 115 via a base station antenna. The BTSs 105 are configured to communicate with the ATs 115 under the control of the BSC 120 via multiple carriers. Each of the BTSs 105 can provide communication coverage for a respective geographic area, here the cell 110-a, 110-b, or 110-c. The system 100 may include BTSs 105 of different types, e.g., macro, pico, and/or femto base stations.

The ATs 115 can be dispersed throughout the cells 110. The ATs 115 may be referred to as mobile stations, mobile devices, user equipment (UE), or subscriber units. The ATs 115 here include cellular phones and a wireless communications device, but can also include personal digital assistants (PDAs), other handheld devices, netbooks, notebook computers, etc.

For the discussion herein, the ATs 115 operate on (are "camped" on) a macro or similar network facilitated by multiple "macro" BTSs 105. Each macro BTS 105 may cover a relatively large geographic area (e.g., several kilometers in radius) and may allow unrestricted access by terminals with service subscription. The ATs 115 are also registered to operate on at least one femto network facilitated by a "femto" or "home" BTS 105. It will be appreciated that, while the macro BTSs 105 may typically be deployed according to network planning (e.g., resulting in the illustrative hexagonal cells 110 shown in FIG. 1), a femto BTS 105 may typically be deployed by individual users (or user representatives) to create a localized femtocell. The localized femtocell does not typically follow the macro network planning architecture (e.g., the hexagonal cells), although it may be accounted for as part of various macro-level network planning and/or management decisions (e.g., load balancing, etc.).

For example, the femto cell is implemented as a femto access point (FAP) located in a user premises, such as a residence, an office building, etc. The location may be chosen for maximum coverage (e.g., in a centralized location), to allow access to a global positioning satellite (GPS) signal (e.g., near a window), and/or in any other useful location. For the sake of clarity, the disclosure herein assumes that a set of ATs 115 are registered for (e.g., on a whitelist of) a single FAP that provides coverage over substantially an entire user premises. The "home" FAP provides the ATs 115 with access to communication services over the cellular network. Similar techniques may be applied to other types of network environments without departing from the scope of the disclosure or claims.

It is worth noting that a cellular network or a WWAN can be considered as including the macro network 100 (e.g., the radio network including the macro BTSs 105) and other networks, such as femto networks, pico networks, micro networks, etc. (e.g., as facilitated by femtocells, picocells, and microcells, respectively). For example, femto networks and/or other types of networks may be used at least to extend the effective range of the macro network to provide more ubiquitous and effective WWAN or cellular service. However, for the sake of simplifying the description, "macro network," "wireless wide-area network (WWAN)," and "cellular network" are used substantially interchangeably herein. Similarly, certain descriptions may refer to "macro signals" and the like, intending generally to include any in-band types of signals (e.g., signals that are in-band with respect to the WWAN). As such, reference to one of these networks or signal types should not be construed as limiting the scope of the disclosure or claims.

Figure 2:
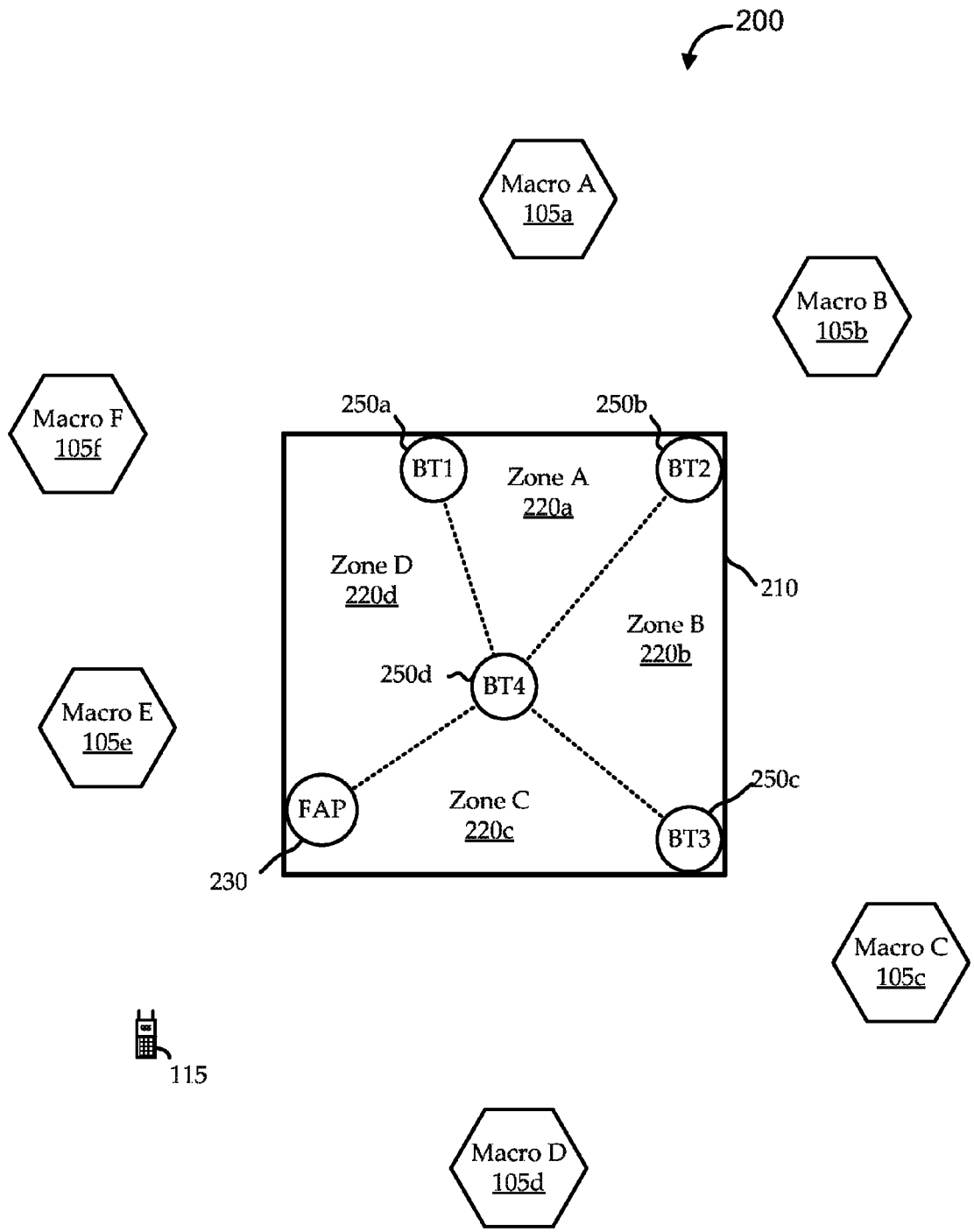
FIG. 2 shows an exemplary portion of a communications system, like the communications system of FIG. 1.

FIG. 2 shows an exemplary portion of a communications system 200, like the communications system 100 of FIG. 1. The portion of the communications system 200 includes a user premises 210 in context of a number of BTSs 105, such as those described with reference to FIG. 1. For example, the BTSs 105 may all be macro BTSs 105 of a macro communications network that provides communications services to an AT 115. Notably, the exemplary portion of the communications system 200 is not shown to scale; and it will be appreciated that the BTSs 105 are likely spread much farther apart. As such, the relative positions and distances illustrated in FIG. 2 are intended only to demonstrate certain features of the exemplary communications system 200.

As illustrated, a femto access point (FAP) 230 is located in the user premises 210. The location may be chosen for maximum coverage (e.g., in a centralized location), to allow access to a global positioning satellite (GPS) signal (e.g., near a window), and/or in any other useful location. The FAP 230 may be a femto BTS 105, as described above, and is positioned and configured to cover a particular femtocell coverage area, assumed for the purposes of this disclosure to effectively cover the user premises 210. Further, the FAP 230 may allow restricted access by at least the AT 115 illustrated in FIG. 2. For example, the FAP 230 may be considered the "home" femtocell of the AT 115.

Notably, the femtocell coverage area (e.g., the user premises 210) is effectively partitioned into zones 220. As illustrated, the zones 220 may be defined according to placement of multiple beacon sources 250. Typically, the FAP 230 will be configured as one of the beacon sources 250. When the AT 115 is positioned in a particular zone 220, the AT 115 will detect a particular beacon signature as a function of the various beacon signals being received from the various beacon sources 250 in proximity to the zone 220. For example, when located in "Zone A" 220a, the AT 115 may detect relatively strong beacon signals from beacon sources 250a, 250b, and 250d, as well as from the FAP 230.

Some or all of the detected beacon signals may be used to generate (e.g., calculate) a beacon signature. For example, the beacon signature may be an unordered list of the three strongest beacon signals being detected (e.g., identified by respective unique beacon source 250 identifiers), a list of detected beacon signals ordered by signal strength, a signal formulated as a function of the combined detected signals, etc. The beacon signature can be used to characterize the zone 220. For example, the AT 115 may be aware of its current zone 220 location by correlating a current beacon signature with a list of expected beacon signatures corresponding to different zones 220.

The beacon signals are typically out-of-band signals. For example, the beacon sources 250 may be Bluetooth or Zigbee transmitters. Notably, the band, protocols, etc. used for beacon communications may be different from those used for out-of-band proxy communications described below. Further, while the zones 220 are shown as having defined boundaries, it will be appreciated that the zones 220 may typically be non-homogenous with only approximate boundary definitions. As such, references to the AT 115 being "in" a zone is intended to denote the AT 115 being in a location characteristic of a particular zone 220 (e.g., in which its respective beacon signature can be reliably detected).

In addition to detecting beacon signals from the beacon sources 250, the AT 115 will also detect macro signals from one or more of the neighboring macro BTSs 105 of the macro network. For example, the macro BTSs 105 may each be intra-frequency, inter-frequency neighbors of the FAP 220 (e.g., other than neighboring femtocells). The AT 115 may detect the macro signals in association with an identifier corresponding to the macro BTS 105 from which the signal is being communicated (e.g., the associated macro cell).

Some or all of the detected macro signals may be used to generate (e.g., calculate) a macro signature. For example, the macro signature may be an unordered list of the three strongest macro signals being detected (e.g., identified by respective unique macro BTS 105 identifiers), a list of detected macro signals ordered by signal strength, a signal formulated as a function of the combined detected signals, etc. The macro signature can be associated with the zone 220 as a zone signature. For example, each zone 220 may be associated with one or more beacon signatures that effectively located the AT 115 within that zone, and further with one or more zone signatures that indicate macro signatures previously detected (e.g., or estimated to be detected) in the respective zone 220.

It will be appreciated that, when the density of neighboring macro BTSs 105 is low or the size of the femtocell coverage area is small (e.g., the actual size or the effective size, as with a small user premises 210), the macro signals detected by the AT 115 may be very similar, regardless of the location of the AT 115 within the femtocell coverage area. For example, as the AT 115 moves throughout the user premises 210, the AT 115 will detect substantially similar macro signals. The detected macro signals may also be substantially similar to those detected by a "network listen" function of the FAP 230. As such, in these low-density or small environments, it may be possible and even desirable to characterize the entire femtocell coverage area as a single zone with a single zone signature.

As the density of macro cells (e.g., the density of neighboring macro BTSs 105, the number of distinct detected macro signals, etc.) increases or the size of the coverage area increases, the macro signals detected and the generated macro signature may change as a function of location within the femtocell coverage area. The zones 220 can be used to effectively partition the femtocell coverage area so as to account for and/or to exploit these variations within the femtocell coverage area. For example, in the illustrative communications system 200, the AT 115 may detect relatively strong macro signals from macro BTSs 105*a* and 105*b* when in Zone A 220*a*; while the AT 115 may detect relatively strong macro signals from macro BTSs 105*e* and 105*f* when in Zone D 220*d*.

Zone-level knowledge of the femtocell coverage area, such as by the techniques described above, can yield a number of features. In some embodiments, the communications system 200 uses the FAP 230 to enhance WWAN (i.e., cellular) functionality. For example, when the AT 115 is in the user premises 210, the femtocell of the FAP 230 may help provide WWAN coverage to areas of the user premises 210 that have undesirable coverage, or the FAP 230 may allow the network to offload some resources to the FAP 230 when the AT 115 is attached. As such, it is desirable for the AT 115 to attach to the FAP 230 when possible, which may involve the AT 115 scanning for the FAP 230.

The AT 115 may generally operate using an internal power supply, such as a small battery, to facilitate highly mobile operation. Strategic deployment of network devices, such as femtocells, can mitigate mobile device power consumption to some extent. For example, femtocells may be utilized to provide service within areas which might not otherwise experience adequate or even any service (e.g., due to capacity limitations, bandwidth limitations, signal fading, signal shadowing, etc.), thereby allowing client devices to reduce searching times, to reduce transmit power, to reduce transmit times, etc. Femtocells provide service within a relatively small service area (e.g., within a house or building). Accordingly, a client device is typically disposed near a femtocell when being served, often allowing the client device to communicate with reduced transmission power.

Typical operation to provide femtocell system selection, however, has an appreciable impact upon the power utilized by the AT 115. Searching for available femtocells within range (e.g., the FAP 230), negotiating links, etc. in typical use scenarios will often result in a reduction of the AT 115 standby time operation available from the internal power supply by approximately 10%. For example, an internal power supply may be appreciably drained as a result of the AT 115 continuing to search for the FAP 230, whether or not an appropriate FAP 230 is in range of the AT 115. Moreover, the use of FAPs 230 often causes interference with respect to other devices in the communications network due to femtocell transmission (i.e., there often exists a trade-off between interference and reliable detection of the FAP 230).

As such, it may be desirable to have the AT 115 scan for the FAP 230 only when in proximity to the FAP 230. One technique for detecting proximity to the FAP 230 is for the AT 115 to look for a predetermined macro signature. While camped on the macro network, the AT 115 may listen for signals from various macro BTSs 105 (e.g., according to certain thresholds), for example, to maintain reliable communications with the macro network and/or other portions of the WWAN. In some embodiments, as these macro signals are detected, macro signatures are generated and correlated with one or more macro signatures indicating proximity to the FAP 230 (i.e., one or more macro signatures that the AT 115 may detect while in the femtocell coverage area). For example, as the AT 115 approaches the FAP 230, it may detect a macro signature that correlates either with a signature generated by the FAP 230 according to its network listen function (e.g., and downloaded previously to the AT 115) or with a signature previously observed by the AT 115 while the AT 115 was in the coverage area of the FAP 230.

When the macro signature detected by the AT 115 indicates proximity to the FAP 230, a relatively low-power, out-of-band radio in the AT 115 may activate (e.g., turn on), if not already active. As described more fully below, the FAP 230 may also be integrated with a compatible out-of-band radio (described below as an out-of-band femto-proxy). Once active, the out-of-band radio of the AT 115 may begin searching for the out-of-band radio integrated with the FAP 230. If discovered, this may indicate with a high level of confidence that the AT 115 is in proximity to its home FAP 230, and the AT 115 may begin scanning for the FAP 230. For example, the out-of-band radio integrated with the FAP 230 may cause the FAP 230 to increase transmit power for AT 115 association, to "wake up" the FAP 230 for client device access, etc.

Additionally or alternatively, the out-of-band radio integrated with the FAP 230 can provide assistance to AT 115 with respect to femtocell selection and association. For example, the out-of-band radio integrated with the FAP 230 may identify the FAP 230 to which the AT 115 is to associate, or otherwise operate in a manner to facilitate association between the FAP 230 and the AT 115. In some cases, the out-of-band radio integrated with the FAP 230 may not operate to provide any direct assistance to the AT 115 with respect to FAP 230 selection and association.

Notably, as described above, certain environments cause the macro signature detected by the AT 115 to be different in different portions of the femtocell coverage area, and different from what is detected by the FAP 230 (e.g., via its network listen functionality). For example, if the AT 115 approaches the user premises 210 from a certain direction, it may detect a macro signature that is different from the one detected by the FAP's 230 network listen. As such, it may not recognize its proximity to the FAP 230, it may fail to activate its out-of-band radio, and it may fail to scan for the FAP 230. This may be undesirable, as the AT 115 may enter the femtocell coverage area and not attach to the FAP 230.

By using zones 220 as described above, the AT 115 may exploit a zone map that includes multiple zone signatures for multiple zones 220 of a single femtocell coverage area. This zone-level definition may yield a higher granularity of information for use by the AT 115, the FAP 230, the WWAN, etc. As described more fully below, these zone signatures may be generated a priori and/or dynamically, and may be used to recognize proximity of the AT 115 to the FAP 230 even in larger or higher macro cell density coverage area environments. For example, as illustrated in FIG. 2, the FAP 230 may see a macro signature that includes signals from macro BTSs 105*d*, 105*e*, and 105*f*. The AT 115 may recognize its proximity to the FAP 230, even if it approaches the user premises 210 from the direction of Zone A 220*a*, where some or all of the same macro signals are undetectable or low-strength.

It will now be appreciated that the use of zones 220 to partition the femtocell coverage area may provide higher granularity of certain types of information within the femtocell coverage area, and that the higher granularity information may yield certain features. As described above, the higher granularity of information may be used to reduce the power needed in some cases for femtocell discovery and/or association. Further, increased granularity may provide for enhanced network planning For example, a typical cellular network may only be able to perform network analysis, load balancing, and/or other macro-level functions to a cell-level granularity (e.g., using network listen data from the various BTSs 105). Techniques, such as those described herein, may allow the WWAN to assess data and perform functions at the sub-cell level, according to zone-level information. Even further, increased granularity may allow for enhanced troubleshooting functionality. For example, operators may be able to more easily identify and resolve low-coverage zones 220 within a femtocell coverage area, identify opportunities for re-leveling cell signal strengths in higher density areas, interference management, etc.

As noted above, certain functionality is facilitated by integrating the FAP 230 functionality with one or more types of out-of-band (OOB) functionality. One type of such functionality is described above with reference to the use of OOB beacon sources 250. Further functionality is effectuated by implementing the FAP 230 as part of a femto-proxy system, which also includes one or more out-of-band femto-proxy subsystems. As used herein, "out-of-band," or "OOB," is intended to include any type of communications that are out of band with respect to the WWAN. For example, the out-of-band femto-proxy subsystems, ATs 115, beacon sources 250, etc. may be configured to operate using Bluetooth (e.g., class 1, class 1.5, and/or class 2), Zigbee (e.g., according to the IEEE 802.15.4-2003 wireless standard), and/or any other useful type of communications out of the WWAN band.

Figure 3A:
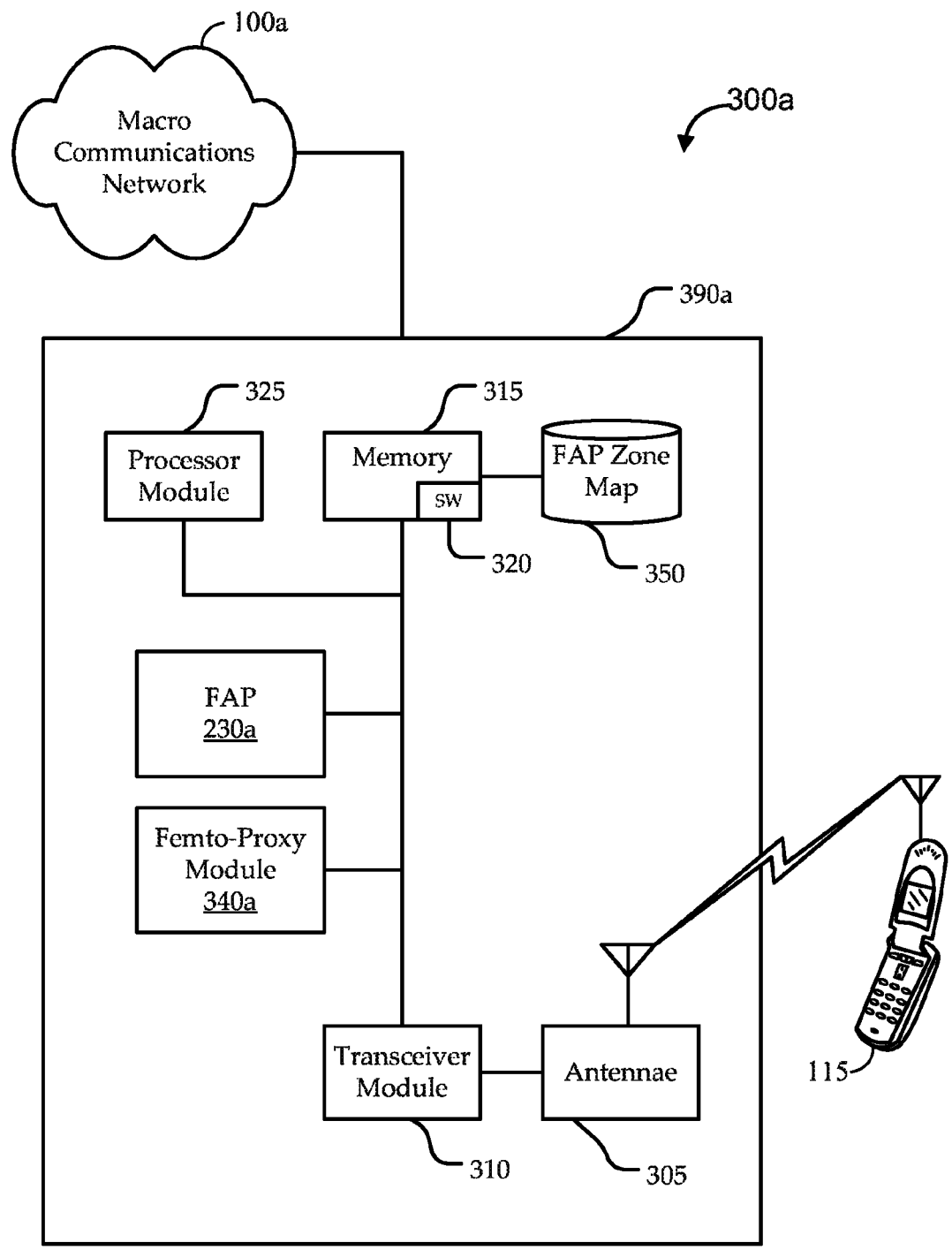
FIG. 3A shows a block diagram of an exemplary wireless communications system that includes a femto-proxy system.

FIG. 3A shows a block diagram of an exemplary wireless communications system 300*a* that includes a femto-proxy system 390*a*. The femto-proxy system 390*a* includes a femto-proxy module 340*a* and a FAP 230*a*, which may be the FAP 230 of FIG. 2. The femto-proxy system 390*a* also includes antennae 305, a transceiver module 310, memory 315, and a processor module 325, which each may be in communication, directly or indirectly, with each other (e.g., over one or more buses). The transceiver module 310 is configured to communicate bi-directionally, via the antennae 305, with ATs 115. The transceiver module 310 (and/or other components of the femto-proxy system 390*a*) is also configured to communicate bi-directionally (e.g., through a wired or wireless link) with a macro communications network 100*a* (e.g., as part of the WWAN, as described above). For example, the transceiver module 210 is configured to communicate with the macro communications network 100*a* via a backhaul network. The macro communications network 100*a* may be the communications system 100 of FIG. 1.

The memory 315 may include random access memory (RAM) and read-only memory (ROM). The memory 315 may store computer-readable, computer-executable software code 320 containing instructions that are configured to, when executed, cause the processor module 325 to perform various functions described herein (e.g., call processing, database management, message routing, etc.). Alternatively, the software 320 may not be directly executable by the processor module 325 but is configured to cause the computer, e.g., when compiled and executed, to perform functions described herein.

The processor module 325 may include an intelligent hardware device, e.g., a central processing unit (CPU) such as those made by Intel® Corporation or AMD®, a microcontroller, an application specific integrated circuit (ASIC), etc. The processor module 325 may include a speech encoder (not shown) configured to receive audio via a microphone, convert the audio into packets (e.g., 30 ms in length) representative of the received audio, provide the audio packets to the transceiver module 310, and provide indications of whether a user is speaking Alternatively, an encoder may only provide packets to the transceiver module 310, with the provision or withholding/suppression of the packet itself providing the indication of whether a user is speaking.

The transceiver module 310 may include a modem configured to modulate the packets and provide the modulated packets to the antennae 305 for transmission, and to demodulate packets received from the antennae 305. While some embodiments may include a single antenna 305, embodiments will typically include multiple antennae 305 for multiple links. For example, one or more links may be used to support WWAN communications with ATs 115. Also, one or more out-of-band links (as described above) may be supported by the same or different antennae 305.

The memory 315 may be configured to store a FAP zone map 350. As described above, the FAP zone map 350 may include zone signatures for the various zones of a femtocell coverage area. The femtocell coverage area may be the area of coverage supported by the FAP 230*a* of the femto-proxy system 390*a*. Of course, the memory 315 may also store information for facilitating communications and or other functionality of the femto-proxy system 390*a*. For example, the memory 315 may store hopping patterns for out-of-band piconets, network settings, timing parameters, network listen information, etc.

Notably, the femto-proxy system 390*a* is configured to provide both FAP 230*a* and femto-proxy module 340*a* functionality. For example, as described above, when the AT 115 approaches the femtocell coverage area, the AT's 115 OOB radio may begin searching for the OOB femto-proxy module 340*a*. Upon discovery, the AT 115 may have a high level of confidence that it is in proximity to the femtocell coverage area, and a scan for the FAP 230*a* can commence.

The scan for the FAP 230*a* may be implemented in different ways. For example, due to the femto-proxy module 340*a* discovery by the AT's 115 OOB radio, both the AT 115 and the femto-proxy system 390*a* may be aware of each other's proximity. In some embodiments, the AT 115 scans for the FAP 230*a*. In other embodiments, the FAP 230*a* polls for the AT 115 (e.g., individually, or as part of a round-robin polling of all registered ATs 115), and the AT 115 listens for the poll. When the scan for the FAP 230 is successful, the AT 115 may attach to the FAP 230, which may thereby provide the AT 115 with a new communications link to the macro communications network 100*a*.

Embodiments of the FAP 230*a* have various configurations of base station or wireless access point equipment. As used herein, a FAP 230a may be a device that communicates with various terminals (e.g., client devices (ATs 115, etc.), proximity agent devices, etc.) and may also be referred to as, and include some or all the functionality of, a base station, a Node B, and/or other similar devices. Although referred to herein as a FAP 230a, it should be appreciated that the concepts herein are applicable to access point configurations other than femtocell configuration (e.g., picocells, microcells, etc.). Embodiments of FAP 230a utilize communication frequencies and protocols native to a corresponding cellular network (e.g., the macro communications network 100a, or a portion thereof) to facilitate communication within a femtocell coverage area associated with the FAP 230a (e.g., to provide improved coverage of an area, to provide increased capacity, to provide increased bandwidth, etc.).

The FAP 230a may be in communication with other interfaces not explicitly shown in FIG. 3A. For example, the FAP 230a may be in communication with a native cellular interface as part of the transceiver module 310 (e.g., a specialized transceiver utilizing cellular network communication techniques that may consume relatively large amounts of power in operation) for communicating with various appropriately configured devices, such as AT 115, through a native cellular wireless link (e.g., an "in band" communication link). Such a communication interface may operate according to various communication standards, including but not limited to wideband code division multiple access (W-CDMA), CDMA2000, global system for mobile telecommunication (GSM), worldwide interoperability for microwave access (WiMax), and wireless LAN (WLAN). Also or alternatively, the FAP 230a may be in communication with one or more backend network interfaces as part of the transceiver module 310 (e.g., a backhaul interface providing communication via the Internet, a packet switched network, a switched network, a radio network, a control network, a wired link, and/or the like) for communicating with various devices or other networks.

As described above, the FAP 230a may further be in communication with one or more OOB interfaces as part of the transceiver module 310 and/or the femto-proxy module 340a. For example, the OOB interfaces may include transceivers that consume relatively low amounts of power in operation and/or may cause less interference in the in-band spectrum with respect to the in-band transceivers. Such an OOB interface may be utilized according to embodiments to provide low power wireless communications with respect to various appropriately configured devices, such as an OOB radio of the AT 115. The OOB interface may, for example, provide a Bluetooth link, an ultra-wideband (UWB) link, an IEEE 802.11 (WLAN) link, etc.

It should be clear that the terms "high power" and "low power" as used herein are relative terms and do not imply a particular level of power consumption. Accordingly, OOB devices (e.g., associated with the OOB beacons, the OOB femto-proxy module 340a, etc.) simply consume less power than native cellular interface (e.g., for macro network or other WWAN communications) for a given time of operation. In some implementations, OOB interfaces also provide relatively lower bandwidth communications, relatively shorter range communication, and/or consume relatively lower power in comparison to the macro communications interfaces. It should be appreciated, however, that there is no limitation that the OOB devices and interfaces be low power, short range, and/or low bandwidth. Embodiments may use any suitable out-of-band link, whether wireless or otherwise, such as IEEE 802.11, Bluetooth, PEANUT, UWB, Zigbee, an IP tunnel, a wired link, etc. Moreover, embodiments may utilize virtual OOB links, such as through use of IP based mechanisms over a WWAN link (e.g., IP tunnel over a WWAN link) that act as a virtual OOB link.

Exemplary femto-proxy modules 340a may provide various types of OOB functionality and may be implemented in various ways. A femto-proxy module 340a may have various configurations of devices, such as a stand-alone processor based system, a processor based system integrated with a host device (e.g., access point, gateway, router, switch, repeater, hub, concentrator, etc.), etc. For example, femto-proxy modules 340a may include various types of interfaces for facilitating various types of communications.

Some femto-proxy modules 340a include one or more OOB interfaces as part of the transceiver module 310 (e.g., a transceiver that may consume relatively low amounts of power in operation and/or may cause less interference than in the in-band spectrum) for communicating with other appropriately configured devices (e.g., an AT 115) for providing interference mitigation and/or femtocell selection herein through a wireless link. One example of a suitable communication interface is a Bluetooth-compliant transceiver that uses a time-division duplex (TDD) scheme.

Certain femto-proxy modules 340a may also include one or more backend network interfaces as part of the transceiver module 310 (e.g., packet switched network interface, switched network interface, radio network interface, control network interface, a wired link, and/or the like) for communicating with various devices or networks. For example, the femto-proxy module 340a may be in communication with the FAP 230a and/or other macro BTSs 105 of the macro communication network 100a through backend network interfaces. Embodiments in which the femto-proxy module 340a is integrated within a host device, such as with FAP 230a, may utilize an internal bus or other such communication interface in the alternative to a backend network interface to provide communications between the femto-proxy module 340a and those other networks or devices, if desired. Additionally or alternatively, other interfaces, such as OOB interfaces, native cellular interfaces, etc., may be utilized to provide communication between femto-proxy module 340a and the FAP 230a and/or other devices or networks, according to embodiments.

Various other architectures are possible according to embodiments of femto-proxy system 390a other than those illustrated by FIG. 3A. The FAP 230a and femto-proxy module 340a may or may not be collocated, integrated into a single device, configured to share components, etc. For example, the femto-proxy system 390a of FIG. 3A shows an integrated FAP 230a and femto-proxy module 340a that at least partially share components, including the antennae 305, the transceiver module 310, the memory 315, and the processor module 325.

Figure 3B:
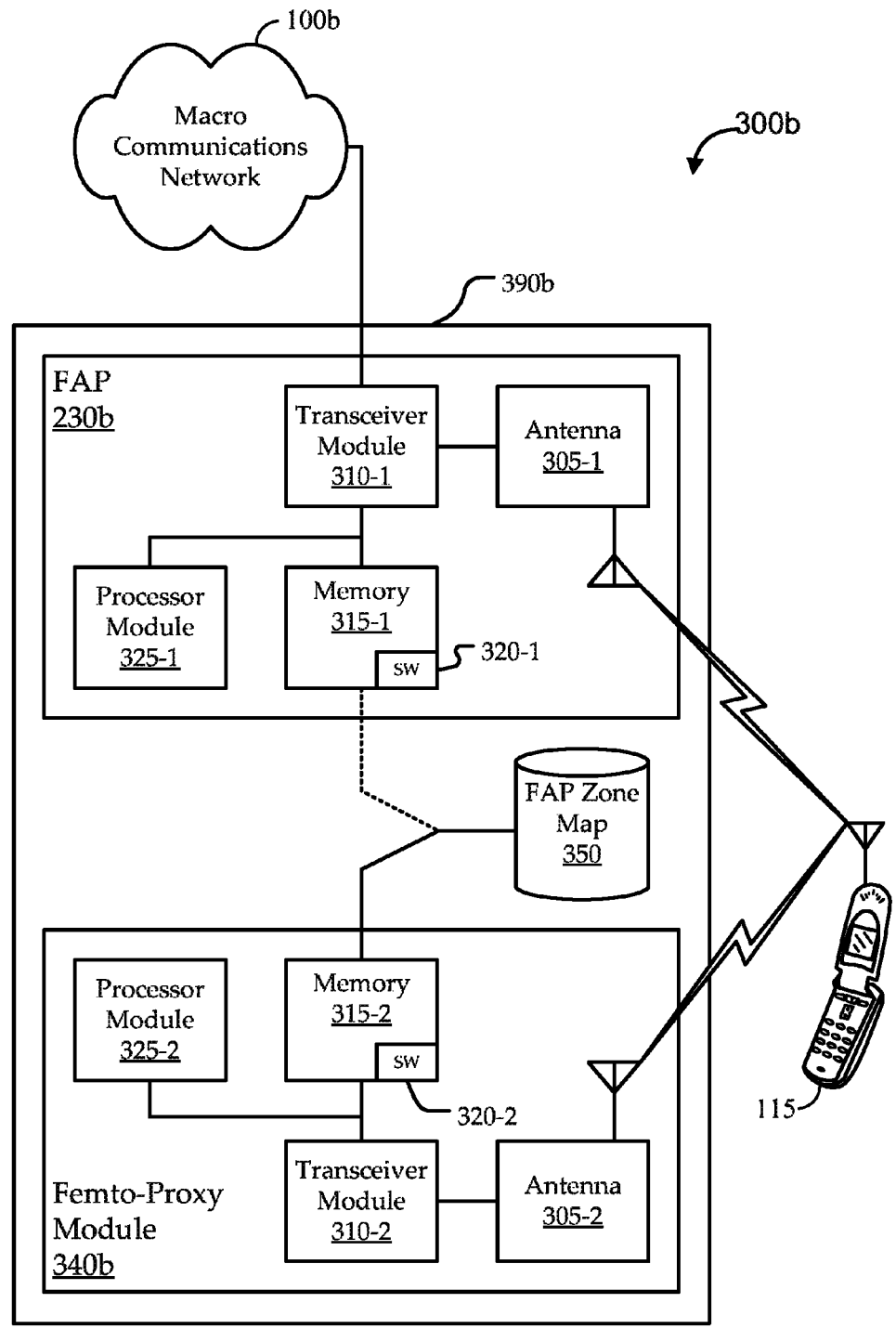
FIG. 3B shows a block diagram of an exemplary wireless communications system that includes an architecture of a femto-proxy system that is different from the architecture shown in FIG. 3A.

FIG. 3B shows a block diagram of an exemplary wireless communications system 300b that includes an architecture of a femto-proxy system 390b that is different from the architecture shown in FIG. 3A. As in FIG. 3A, the femto-proxy system 390b includes a femto-proxy module 340b and a FAP 230b. Unlike FIG. 3A, however, each of the femto-proxy module 340b and the FAP 230b has its own antenna 305, transceiver module 310, memory 315, and processor module 325. Both transceiver modules 310 are configured to communicate bi-directionally, via their respective antennae 305, with ATs 115. Further, both the femto-proxy module 340b and the FAP 230b are illustrated as in communication with the FAP zone map 350.

Figure 4A:
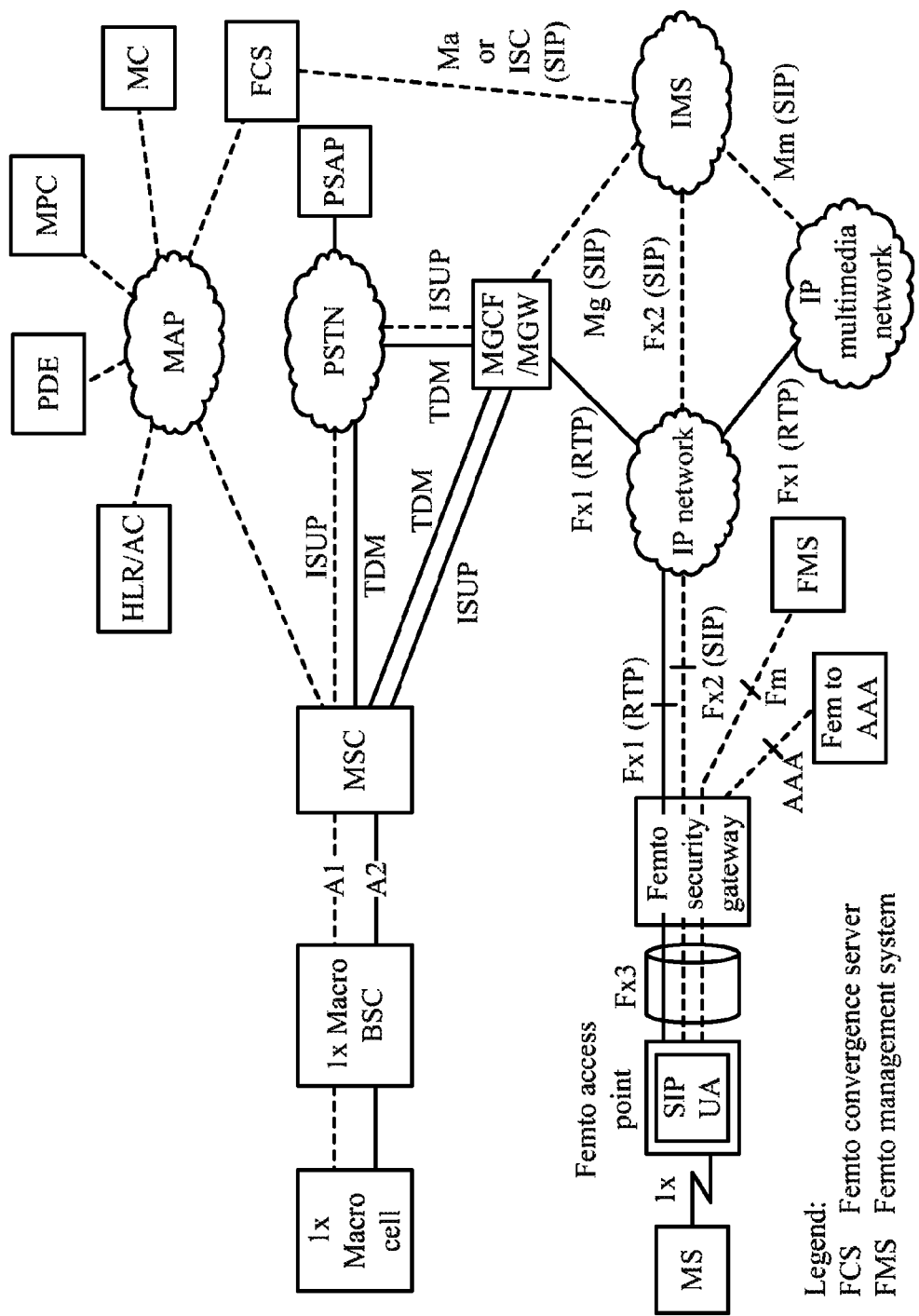
FIG. 4A shows detail regarding an exemplary femtocell architecture for legacy circuit services, like a CDMA 1X circuit switched services network.
Figure 4B:
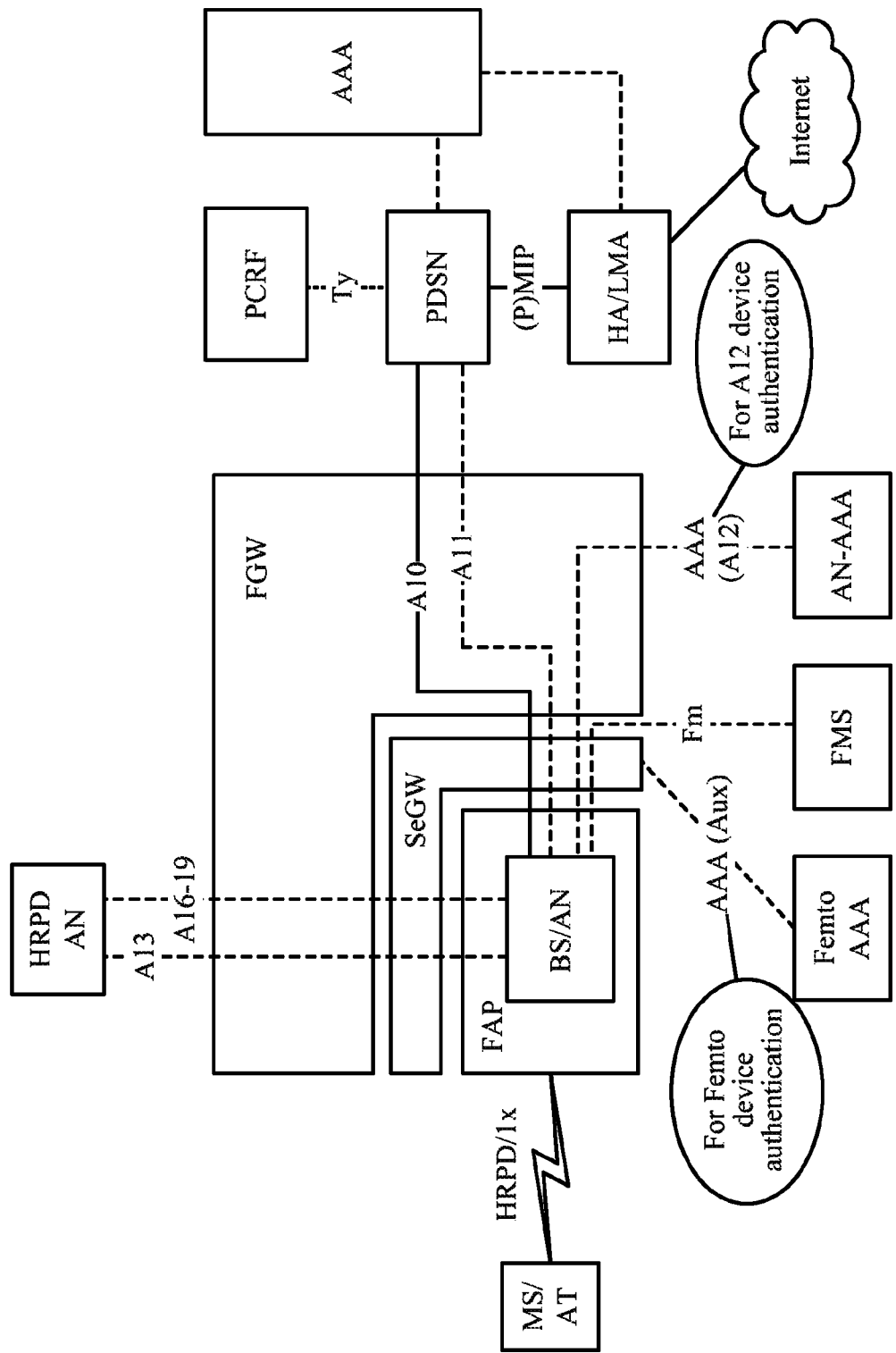
FIG. 4B shows detail regarding an exemplary femtocell architecture for packet data service access using legacy interfaces, like a 1x EV-DO (HRPD) packet data services network.

FIGS. 4A and 4B show further detail with respect to femtocell architecture in communication networks for providing various services. Specifically, Specifically, FIG. 4A shows detail regarding an exemplary femtocell architecture for legacy circuit services. For example, the network of FIG. 4A may be a CDMA 1X circuit switched services network. FIG. 4B shows detail regarding an exemplary femtocell architecture for packet data service access using legacy interfaces. For example, the network of FIG. 4B may be a 1x EV-DO (HRPD) packet data services network. These exemplary architectures may illustrate portions of the communications systems and networks FIGS. 1-3B.

Figure 5A:
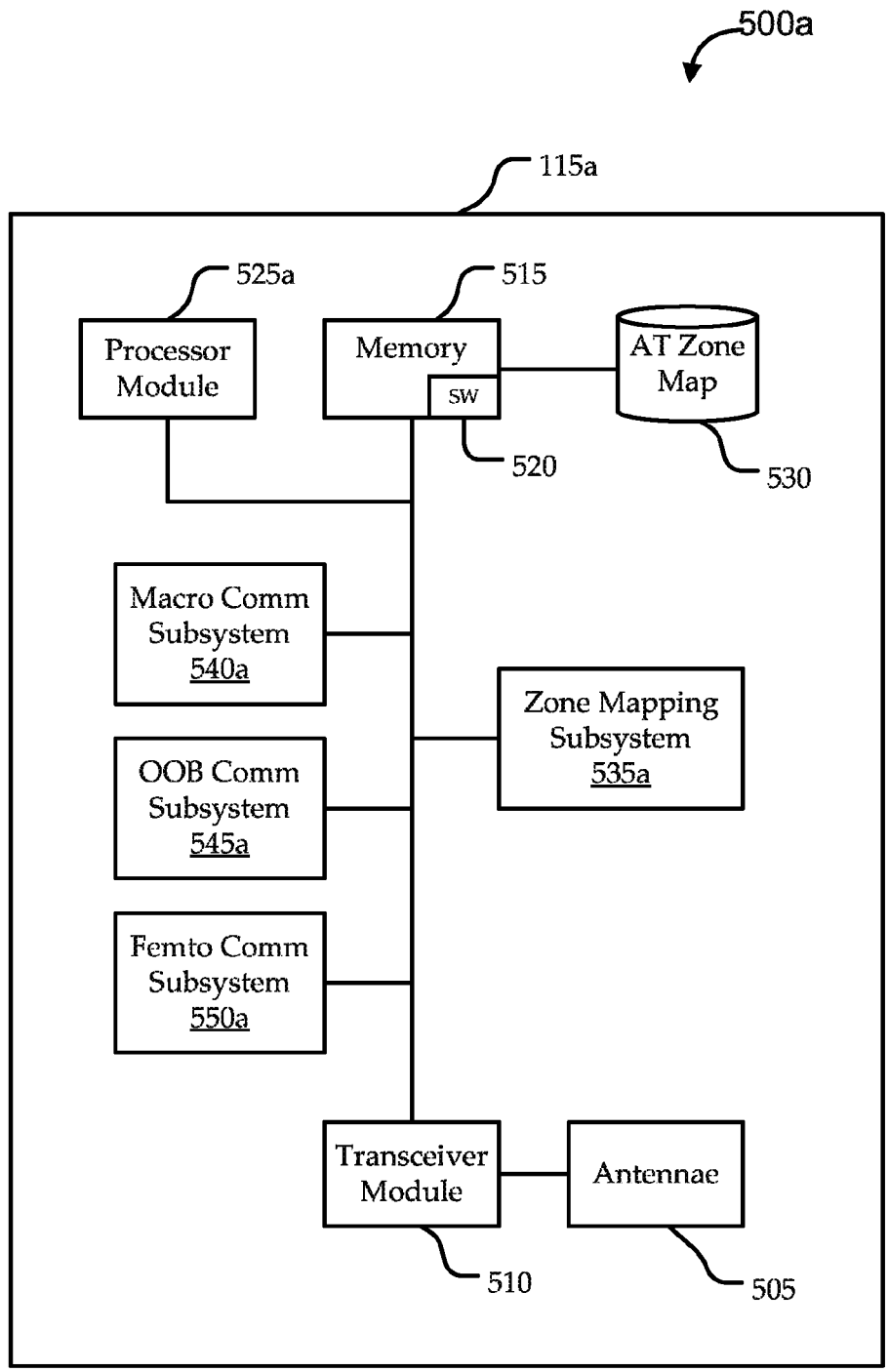
FIGS. 5A and 5B show block diagrams of exemplary mobile access terminals for use with the femto-proxy systems of FIGS. 3A and 3B and in the context of the communications systems and networks of FIGS. 1-4B.
Figure 5B:
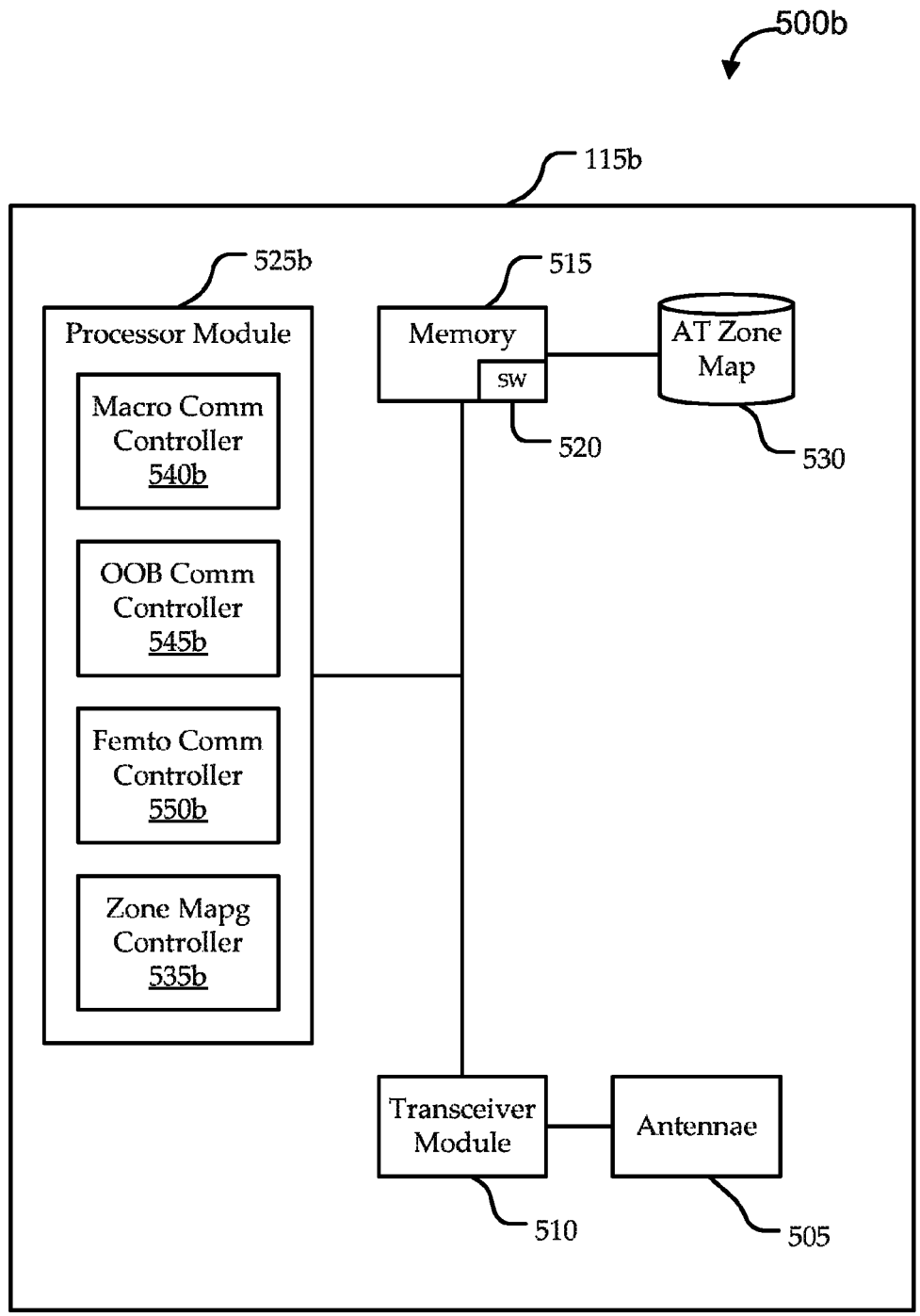

As described above, the femto-proxy systems 390 are configured to communicate with client devices, including ATs 115. FIGS. 5A and 5B show block diagrams 500 of exemplary mobile access terminals (ATs) 115 for use with the femto-proxy systems 390 of FIGS. 3A and 3B and in the context of the communications systems and networks of FIGS. 1-4B. Embodiments of the ATs 115 may have various configurations of devices, such as personal computers (e.g., laptop computers, netbook computers, tablet computers, etc.), cellular telephones, PDAs, digital video recorders (DVRs), internet appliances, gaming consoles, e-readers, etc. For the purpose of discussion, the ATs 115 are assumed to be provided in a mobile configuration, having an internal power supply (not shown), such as a small battery, to facilitate mobile operation.

The ATs 115 of FIGS. 5A and 5B represent two exemplary architectures for providing similar or identical functionality. Each AT 115 includes antennae 505, a transceiver module 510, memory 515, and a processor module 525, which each may be in communication, directly or indirectly, with each other (e.g., via one or more buses). The transceiver module 510 is configured to communicate bi-directionally, via the antennae 505 and/or one or more wired or wireless links, with one or more networks, as described above. For example, the transceiver module 510 is configured to communicate bi-directionally with BTSs 105 of the macro communications network (e.g., the communications system 100 of FIG. 1), and, in particular, with at least one FAP 320.

As described above, the transceiver module 510 may be configured to further communicate over one or more OOB links. For example, embodiments communicate with a femto-proxy system 390 (e.g., as described with reference to FIGS. 3A and 3B) over both an in-band (e.g., WWAN) link to the FAP 230 and at least one OOB link to the femto-proxy module 340. The transceiver module 510 may include a modem configured to modulate the packets and provide the modulated packets to the antennae 505 for transmission, and to demodulate packets received from the antennae 505. While some embodiments may include a single antenna 505, embodiments will typically include multiple antennae 505 for multiple links.

The memory 515 may include random access memory (RAM) and read-only memory (ROM). The memory 515 may store computer-readable, computer-executable software code 520 containing instructions that are configured to, when executed, cause the processor module 525 to perform various functions described herein (e.g., call processing, database management, message routing, etc.). Alternatively, the software 520 may not be directly executable by the processor module 525 but is configured to cause the computer, e.g., when compiled and executed, to perform functions described herein.

The processor module 525 may include an intelligent hardware device, e.g., a central processing unit (CPU) such as those made by Intel® Corporation or AMD®, a microcontroller, an application specific integrated circuit (ASIC), etc. The processor module 525 may include a speech encoder (not shown) configured to receive audio via a microphone, convert the audio into packets (e.g., 30 ms in length) representative of the received audio, provide the audio packets to the transceiver module 510, and provide indications of whether a user is speaking. Alternatively, an encoder may only provide packets to the transceiver module 510, with the provision or withholding/suppression of the packet itself providing the indication of whether a user is speaking.

The memory 515 may be configured to store an AT zone map 530. As described above, the AT zone map 530 may include zone signatures for some or all of various zones of a femtocell coverage area, for example, the AT's 115 home FAP's 230 coverage area. Of course, the memory 515 may also store information for facilitating communications and or other functionality of the ATs 115. For example, the memory 515 may store hopping patterns for out-of-band piconets, network settings, timing parameters, network listen information, etc.

According to the exemplary architecture of FIG. 5A, the AT 115a further includes a zone mapping subsystem 535a, a macro communications subsystem 540a, an OOB communications subsystem 545a, and a femto communications subsystem 550a. These various subsystems are shown as components of the AT 115. For example, the component subsystems may be separate components in communication with some or all of the other components of the AT 115a via a bus.

In one exemplary AT 115, the component subsystems may operate as follows. As described above, the AT zone map 530 includes zone signatures, each representing a macro signature associated with one of a number of zones of the home FAP 230 coverage area. The macro communications subsystem 540a is configured to detect macro signals from neighboring macro BTSs 105, calculate a macro signature according to the detected macro signals, and determine whether the macro signature correlates with one of the zone signatures in the AT zone map 530. The OOB communications subsystem 545a is configured to initiate a scan to detect an OOB femto-proxy (e.g., femto-proxy system 390) when the detected macro signature correlates with one of the zone signatures. The femto communications subsystem 550a is configured to become available for communications with the FAP 230 when the OOB femto-proxy is detected by the OOB communications subsystem 545a.

The zone mapping subsystem 535a may be configured to generate, update, refine, verify, and/or otherwise affect the AT zone map 530 (and/or the FAP zone map 350). One exemplary zone mapping subsystem 535a detects beacon signals originating from proximately located beacon sources (the beacon sources 250 of FIG. 2) when the AT 115 is attached to the femto-proxy system 390. The zone mapping subsystem 535a may calculate a current beacon signature according to a combination of the detected beacon signals and determine a zone of the femtocell coverage area corresponding to the current beacon signature. A zone signature may be generated by associating a detected macro signature (e.g., from the macro communications subsystem 540a) with the zone of the femtocell coverage area corresponding to the current beacon signature. The AT zone map 530 (and/or the FAP zone map 350) can be updated, accordingly. Alternatively, the zone mapping subsystem 535a may download at least one zone signature from the femto-proxy system 390 to the AT 115 and update the AT zone map 530, accordingly.

Notably, the functionality of the component subsystems may be implemented in other ways. For example, according to the exemplary architecture of FIG. 5B, the AT 115b includes a zone mapping controller 535b, a macro communications controller 540*b*, an OOB communications controller 545*b*, and a femto communications controller 550*b*. These various controllers are shown as components (e.g., hardware and/or software elements) of the processor module 525 and may perform functionality of the zone mapping subsystem 535*a*, macro communications subsystem 540*a*, OOB communications subsystem 545*a*, and femto communications subsystem 550*a* of FIG. 5A, respectively. Alternatively, the functionality of some or all of the component subsystems or controllers may be implemented as part of a computer program product, or in some other way.

It is worth noting that the ATs 115 include communications functionality for interfacing with both the macro (e.g., cellular) network and one or more OOB networks (e.g., the femto-proxy module 340 link. For example, some ATs 115 include native cellular interfaces as part of the transceiver module 510, the macro communications subsystem 540*a*, and/or the femto communications subsystem 550*a* (e.g., a transceiver utilizing cellular network communication techniques that consume relatively large amounts of power in operation) for communicating with other appropriately configured devices (e.g., for establishing a link with a macro communication network via FAP 230) through a native cellular wireless link. The native cellular interfaces may operate according to one or more communication standards, including, but not limited to, W-CDMA, CDMA2000, GSM, WiMax, and WLAN.

Furthermore, the ATs 115 may also include OOB interfaces implemented as part of the transceiver module 510 and/or the OOB communications subsystem 545*a* (e.g., a transceiver that may consume relatively low amounts of power in operation and/or may cause less interference than in the in-band spectrum) for communicating with other appropriately configured devices through a wireless link. One example of a suitable OOB communication interface is a Bluetooth-compliant transceiver that uses a time-division duplex (TDD) scheme. Other examples, like Zigbee-compliant transceivers are mentioned above.

It will be appreciated that various types of trigger conditions may cause the AT 115 to activate an OOB interface (e.g., Bluetooth radio) to send a femto-proxy module 340 inquiry or page according to embodiments include various measurements, determinations, etc., such as the AT 115 being located in a preferred user zone (e.g., by analyzing location signatures), the AT's 115 location is not changing for a period of time, etc. In establishing one or more trigger conditions, the AT 115 may collect location signatures (e.g., beacon signatures, macro signatures, zone signatures, etc., as described above) while in association with the femto-proxy module 340 and/or the FAP 230. Additionally or alternatively, the FAP 230 network listen (NL) may perform network environment measurements, whereby a network planning task may be run to predict the signatures within the service area of a FAP 230 and/or femto-proxy module 340.

The foregoing signatures may be provided in a record, such as in a predetermined format (e.g., PN offset, Cell ID, NID, SID, Ec/Io etc.), for later use in determining that the AT 115 is in a location that the femto-proxy module 340 is to be requested. For example, as discussed above, the AT 115 may store the signatures in a memory thereof (e.g., in an AT zone map 530), perhaps marking or otherwise designating such signatures as proximity agent resource location (PARL) signatures. Of course, PARL signatures may utilize parameters in addition to or in the alternative to the foregoing exemplary parameters, such as PSC, RSCP, etc. Multiple such PARL signatures may be stored, such as to facilitate femto-proxy module 340 operation at multiple locations (home, office, frequently visited location, etc.). Further, as discussed herein, multiple zone-specific PARL signatures may be used to improve femtocell detection (e.g., rather than using a single PARL signature for the FAP 230).

Whenever the AT 115 is in or near a location potentially represented by a PARL signature (e.g., the client device is camped on any of the corresponding macro BTSs 105), the AT 115 may operate to compare a currently measured signature with the stored PARL signatures and trigger the OOB search process when a match is found (e.g., a match may mean that any of the macro BTS 105 pilots are within ±x of its PARL signature value, for example). If, however, a signature or trigger condition is met, but a femto-proxy module 340 is not discovered within a few attempts, operation of certain embodiments of the AT 115 will fall back on traditional or other resource selection techniques (e.g., traditional femtocell discovery approaches).

It should be appreciated that operation to request femto-proxy module 340 services according to embodiments may result in little impact on power consumption by the AT 115 adapted to operate with the femto-proxy module 340 (e.g., little impact upon client device standby time), through use of trigger conditions to avoid unnecessary background searches. That is, femto-proxy module 340 detection over OOB links based on presence of trigger conditions as discussed above may consume less power than more traditional femtocell searches. Moreover, ATs 115 adapted to operate with the femto-proxy module 340 may operate to perform a background search for a FAP 230 only when in proximity of the FAP 230 (e.g., when detecting the femto-proxy module 340), thereby providing power savings. It should be appreciated that the foregoing may be provided without causing interference to other ATs 115 operating in association with a macro-cell of the network.

Figure 6:
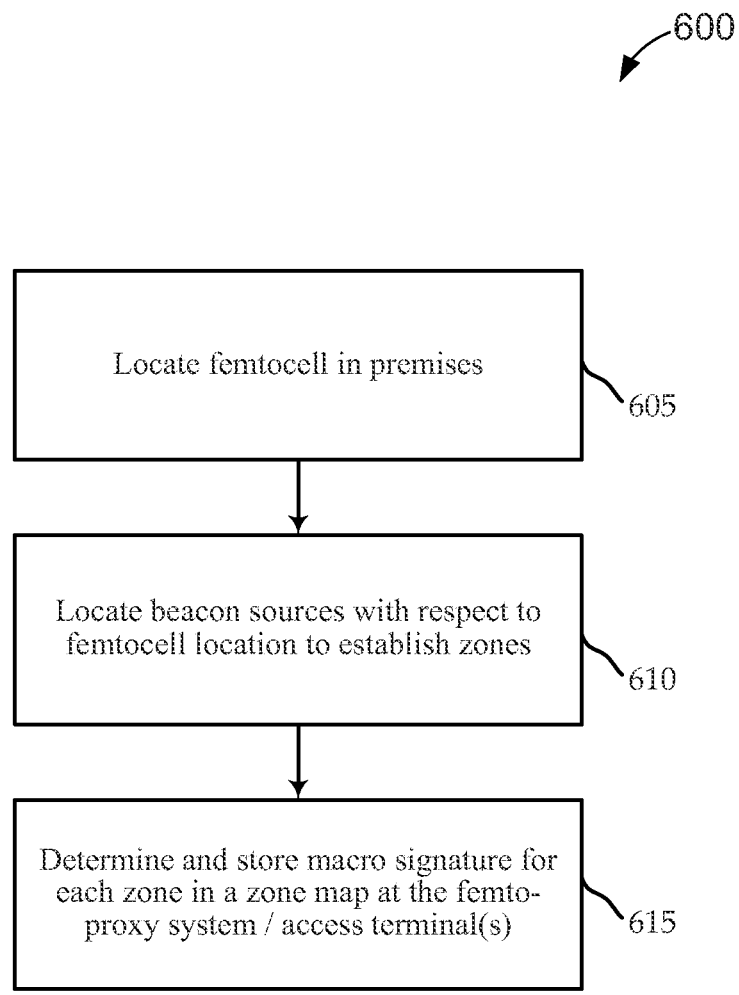
FIG. 6 shows a flow diagram of a method for generating a zone map.

As discussed above, certain additional features may be facilitated by partitioning the femtocell coverage area into multiple zones (e.g., the zones 220 described with reference to FIG. 2). FIGS. 6-10 discuss various techniques for creating and using zones to provide additional AT 115 and/or femto-proxy system 390 functionality. Turning first to FIG. 6, a flow diagram is shown of a method 600 for generating a zone map. The generated zone map may be stored as the AT zone map 530 and/or as the FAP zone map 350.

The method 600 begins at stage 605 by locating a femtocell in a user premises. For example, a femto-proxy system 390 is installed in a user's home or office, thereby creating an effective femtocell coverage area. At stage 610, beacon sources are located in various locations with respect to the femtocell location to establish zones. For example, as shown in FIG. 2, beacon sources 250 may be dispersed throughout the user premises 210 to create multiple zones 220. At stage 615 macro signatures are detected (e.g., and/or calculated) for each zone and stored in a zone map. The generated zone map may be stored as the AT zone map 530 and/or as the FAP zone map 350 at the ATs 95 and/or FAPs 230, respectively.

The generated zone map may be stored as the FAP zone map 350 at the FAPs 230 in various ways. According to some embodiments, the generated zone map is stored at the ATs 95 as respective AT zone maps 530, which are periodically (or otherwise) uploaded to the FAP 230 to update, validate, or replace the FAP zone map 350. According to other embodiments, the network listen functionality of the FAP 230 is used to determine macro signatures for the various zones, which are then stored as the FAP zone map 350 at the FAPs 230.

Figure 7A:
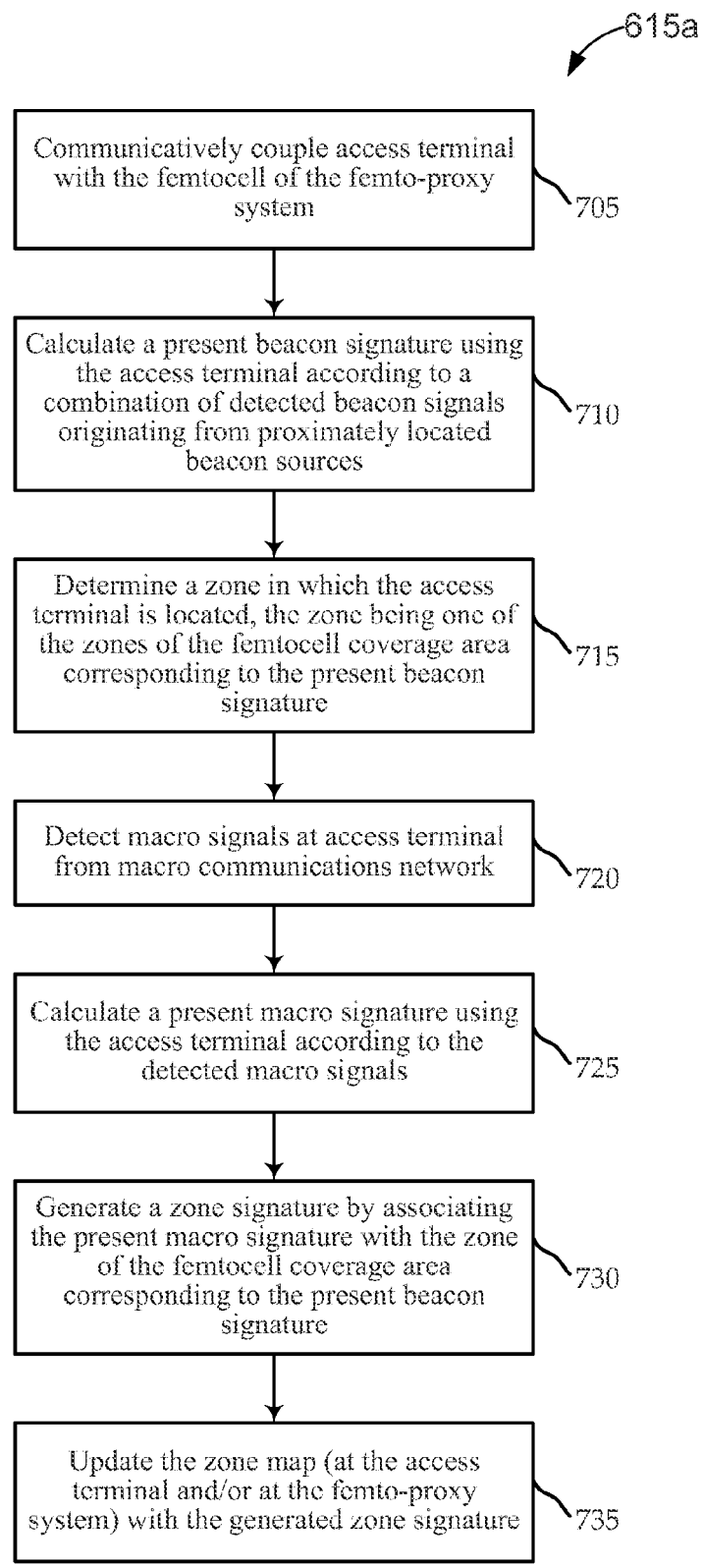
FIGS. 7A and 7B show flow diagrams of exemplary methods for generating zone signatures.

It will be appreciated from the descriptions above that there are many ways to detect the macro signatures for the zones (i.e., to generate zone signatures), as in stage 615. FIG. 7A shows a flow diagram of an exemplary method 615*a* for generating zone signatures, for example, according to stage 615 of FIG. 6. The method 615a begins at stage 705 by communicatively coupling an access terminal with the femtocell of the femto-proxy system. For example, at the start of the method 615a, the AT 95 is attached to the FAP 230 of a femto-proxy system 390 with which it is registered or otherwise authorized to attach (e.g., a home femto, an office femto, etc.).

At stage 710, a present beacon signature is calculated (e.g., using the access terminal) according to a combination of detected beacon signals originating from proximately located beacon sources. For example, as described with reference to FIG. 2, OOB beacon signals originating from a number of beacon sources 250 (e.g., which may include a beacon signal originating from a beacon source 250 in the femto-proxy system 390) are detected by the AT 115. The AT 115 may generate a beacon signature according to the beacon signals and/or identifiers of the beacon sources 250 from which those detected beacon signals are originating.

At stage 715, a determination is made (e.g., by the AT 115 or the femto-proxy system 390) of the zone of the femtocell coverage area in which the access terminal is currently located. The determination at stage 715 is made according to the beacon signature. For example, each zone may be effectively correlated with the beacon signature detected in that zone (e.g., in some central location within that zone). It will be appreciated that the use of beacon signatures to define and/or recognize a previously defined zone, as in stages 710 and 715, suggest that the zone definitions may be static or dynamic. For example, zones may be defined a priori and assumed to remain static. Alternatively, zones may continually be updated (e.g., or verified, etc.) from detected beacon signatures. If beacon sources 250 experience failures, are moved, are added or removed, etc., the zone definitions may be appropriately modified.

Macro signals may be detected by the access terminal from the macro communications network at stage 720. For example, the AT 115 may constantly or periodically measure signal strengths of macro BTSs 105 on the macro network where the AT 115 is currently camped. The macro BTS 105 identifiers and signal strengths associated with detected macro signals may be used by the AT 115 for a number of standard functions, such as in making idle hand-off determinations, looking for preferred BTS 105 nodes, etc. Thus, the detection at stage 720 may or may not be part of the standard operation of the AT 115 while on the macro network. In some cases, at stage 725, a present macro signature is calculated (e.g., by the AT 115) according to the detected macro signals.

At stage 730, a zone signature is generated by associating the present macro signature calculated in stage 725 with the zone of the femtocell coverage area determined in stage 715 to correspond with the present beacon signature. The zone map may be updated according to the generated zone signature at stage 735. For example, a delta may be computed between the generated zone signature and the zone signature that is currently stored. In some embodiments, the zone map is updated at stage 735 only when the delta is significant (e.g., or above a certain predefined threshold), for example, to avoid excessive updates to the zone map.

As discussed above, the updated zone map may be the AT zone map 530 and/or as the FAP zone map 350 of the ATs 115 and/or FAPs 230, respectively. For example, the AT zone map 530 may be updated at the AT 115 and subsequently uploaded to the femto-proxy system 390 for updating of the FAP zone map 350. Alternatively, some or all of the signature generation (e.g., of stages 715, 725, and 730) may be implemented at the femto-proxy system 390 for use in updating the FAP zone map 350 where needed. The information may subsequently be downloaded in whole or in part to ATs 115 for use in updating or generating the AT zone maps 530.

Figure 7B:
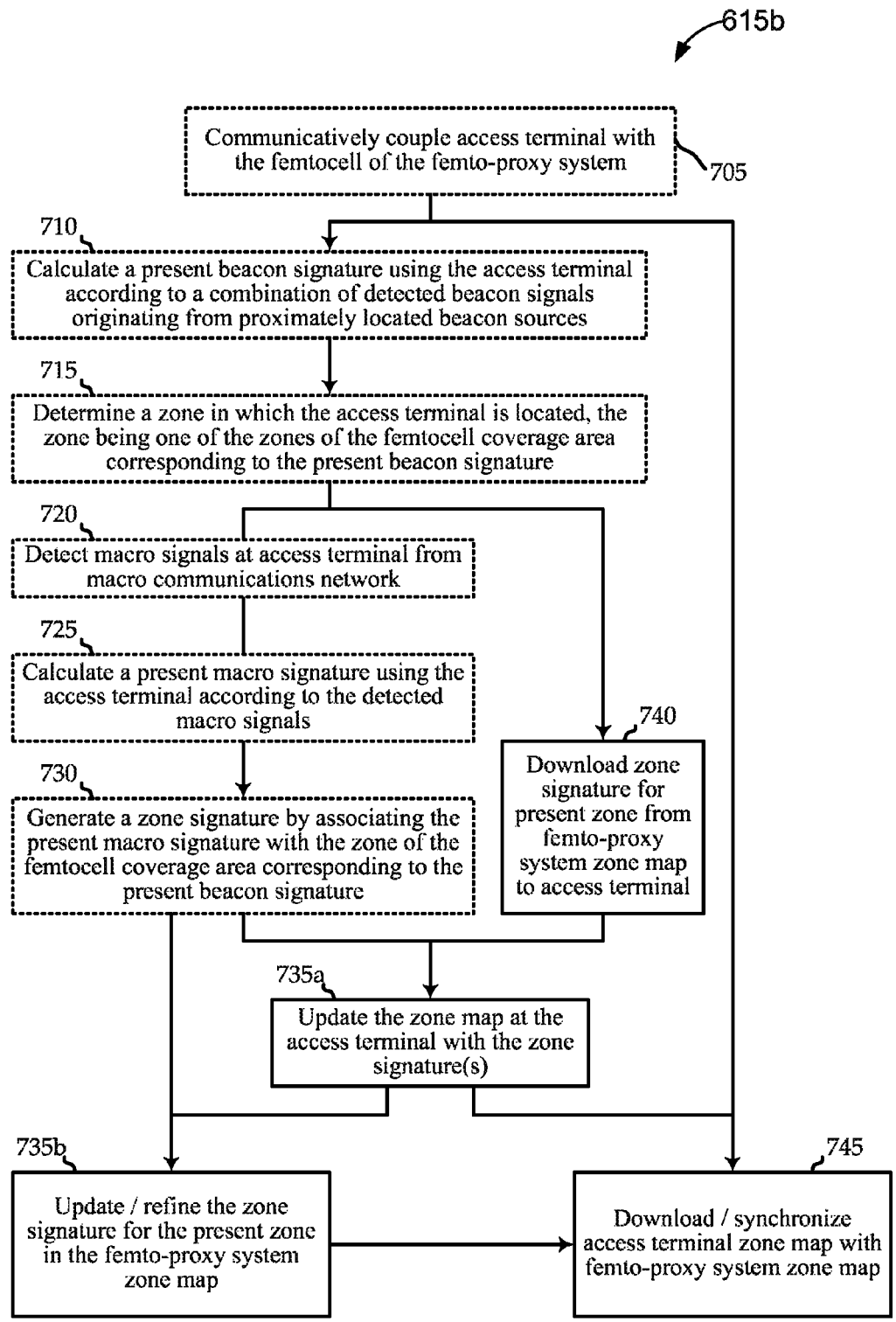

A flow diagram of another exemplary method 615b for generating zone signatures is shown in FIG. 7B, for example, according to stage 615 of FIG. 6. Certain stages of the method 615b may be substantially identical to those described with reference to FIG. 7A and are shown in dashed boxes to provide additional context and clarity to the method 615b description. For example, as in FIG. 7A, the method 615b begins at stage 705 by communicatively coupling an access terminal with the femtocell of the femto-proxy system 390.

Once the access terminal has attached with the femtocell, various paths may be traversed through the method 615b. According to one path, the access terminal may simply download an access terminal zone map (e.g., AT zone map 530) according to a femto-proxy system zone map (e.g., FAP zone map 350) at stage 745. For example, the AT zone map 530 may be generated (e.g., "on the fly") from the download, used to periodically synchronize the AT 115 and femto-proxy system 390 views of the zones, used to verify and/or update the AT zone map 530, etc.

According to a different path, the method 615b may continue at stage 710 where a present beacon signature is calculated (e.g., using the access terminal) according to a combination of detected beacon signals originating from proximately located beacon sources. At stage 715, a determination is made of the zone of the femtocell coverage area in which the access terminal is currently located. At this stage, the method 615b may again bifurcate. According to one path, each zone signature is generated as described with reference to stages 720-730 of FIG. 7A. In particular, macro signals may be detected by the access terminal from the macro communications network at stage 720, used to generate a present macro signature calculated in stage 725, and correlated with the present zone determined in stage 715 to generate the corresponding zone signature at stage 730. According to another path, the zone signature corresponding with the present zone determined in stage 715 is downloaded from the femto-proxy system 390 (e.g., from the FAP zone map 350) at stage 740.

The generated or downloaded zone signature may be used to update or refine one or more zone maps. At stage 735a, a zone map in the access terminal is updated according to the zone signature from stage 730 or 740. At stage 735b, a zone map in the femto-proxy system 390 is updated according to the zone signature from stage 730 or 740. The information from the zone maps may be shared in some cases. For example, the AT zone map 530 may be used to update the FAP zone map 350, and/or the FAP zone map 350 may be used to update the AT zone map 530. In one exemplary case, the AT zone map 530 and the FAP zone map 350 are synchronized at block 745.

Figure 8:
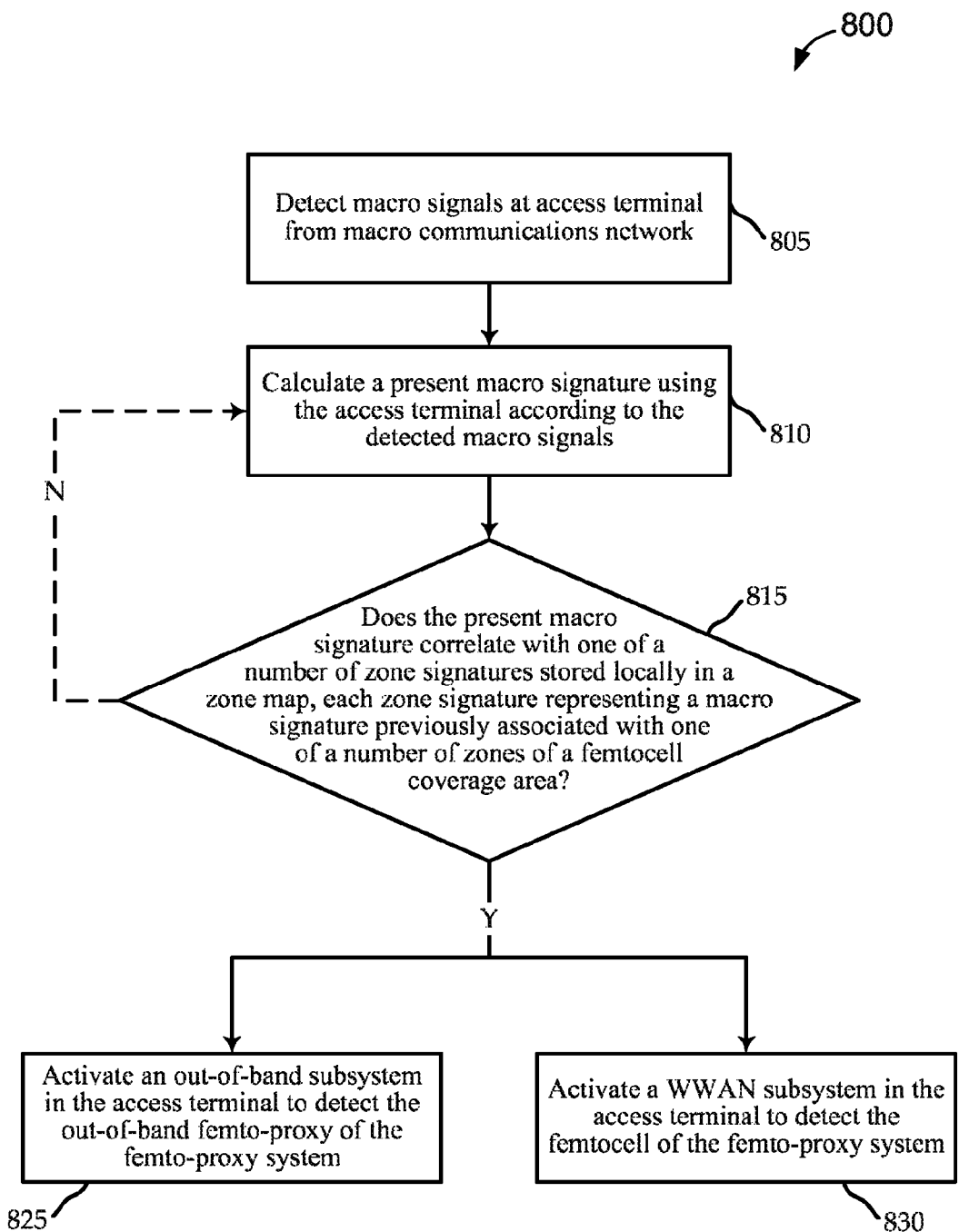
FIG. 8 shows a flow diagram of an exemplary method for selective activation of an access terminal OOB radio using partitioned femtocell coverage area information.
Figure 9:
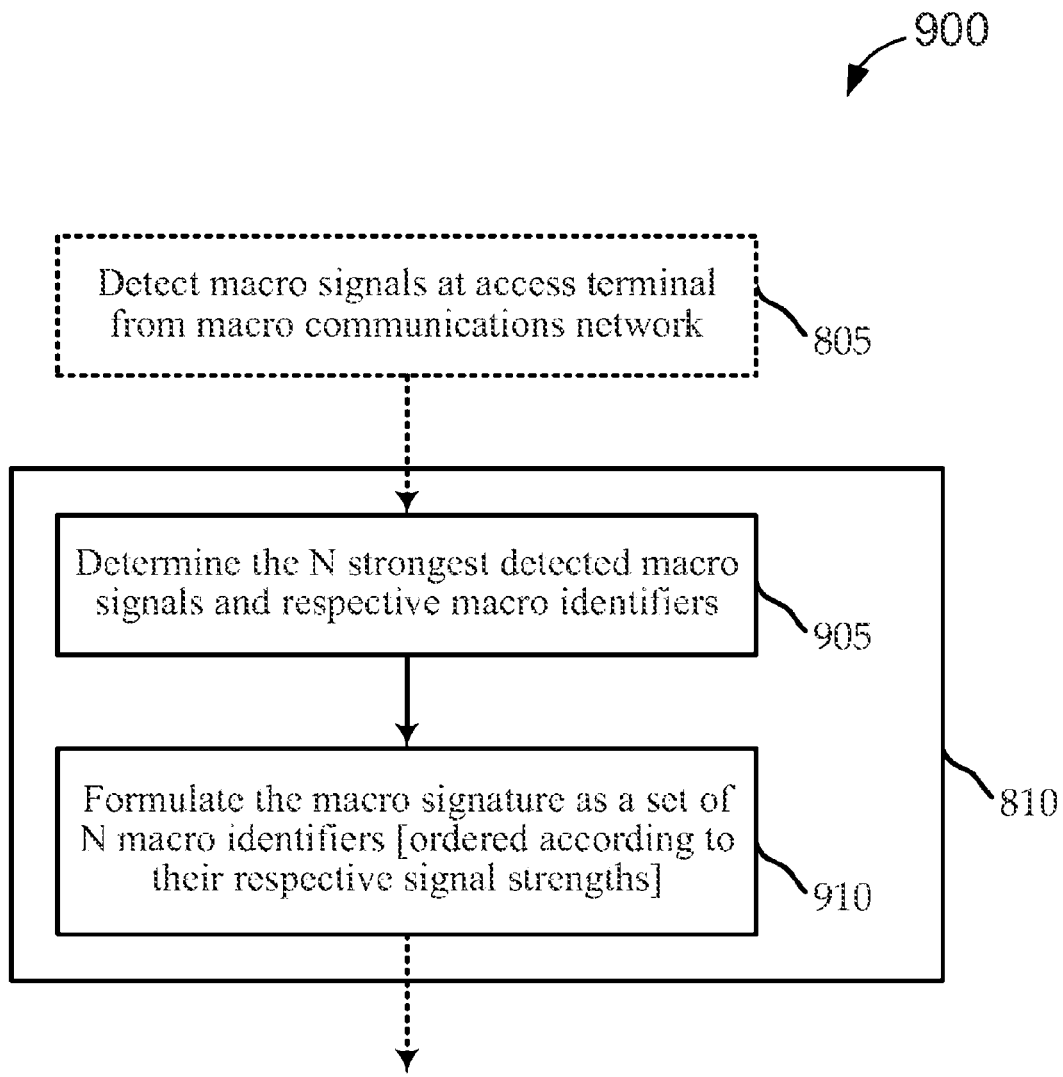
FIG. 9 shows a flow diagram of an exemplary method for calculating a present macro signature.
Figure 10:
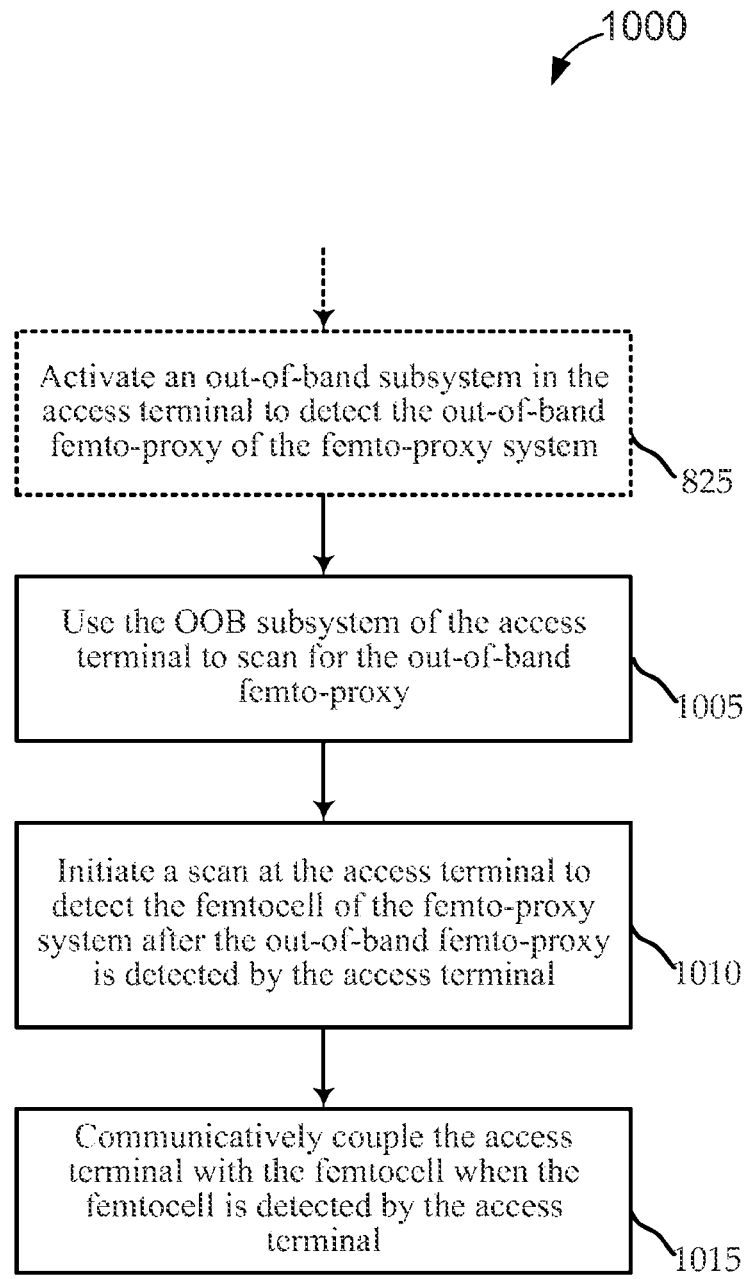
FIG. 10 shows a flow diagram of an exemplary method that continues the method of FIG. 8.

The zones having been established and partial or complete zone maps having been generated, they may be used to provide various types of functionality. Some of this functionality is illustrated by the methods of FIGS. 8-10. FIG. 8 shows a block diagram of an exemplary method 800 for selective activation of an access terminal OOB radio using partitioned femtocell coverage area information.

The method 800 begins at stage 805 by detecting macro signals at the access terminal from the macro communications network. For example, the AT 115 may constantly or periodically measure signal strengths of macro BTSs 105 on the macro network where the AT 115 is currently camped (e.g., based on thresholds, periodically, or otherwise). Thus, the detection at stage 720 may or may not be part of the standard operation of the AT 115 while on the macro network. In some cases, at stage 810, a present macro signature is calculated (e.g., by the AT 115) according to the detected macro signals.

One exemplary method 900 for calculating the present macro signature is illustrated in FIG. 9. As illustrated, after detecting macro signals at the access terminal from the macro communications network at stage 805 of FIG. 8 (shown in a dashed box for reference), the N strongest detected macro signals and respective macro identifiers may be determined at stage 905. For example, it may be desirable only to choose the three strongest macro signals to use in generating the macro signature at stage 810.

The N strongest macro signals may be used in different ways to generate the macro signal, for example, depending on the amount of variation seen in macro signals from one zone to the next. As illustrated, in stage 910, the macro signature may be formulated as a set of N macro identifiers that may or may not be ordered according to their respective signal strengths. For example, if macro signals from three macro BTSs 105 (A, B, and C) are detected, one exemplary macro signature would include the unordered set "[A B C]." Another exemplary macro signature may include the same set, but ordered according to signal strength (e.g., "[B C A]," where B is stronger than C, which is stronger than A). Of course many other types of macro signatures may be generated. For example, a formula or algorithm may be applied to the macro identifiers, the signal strengths, etc. to generate a combined signal for use as the macro signature.

Returning to the method 800 of FIG. 8, at stage 815, a determination is made as to whether the present macro signature from stage 810 correlates with one of a number of zone signatures stored locally in a zone map (e.g., the AT zone map 530). For example, the zone signatures in the zone map represent macro signatures previously associated with one of a number of zones of a femtocell coverage area. The previous association may be implemented in some cases according to the method 615a or 615b of FIG. 7A or 7B, respectively, or in some other way. For example, the zone map may be generated a priori and/or dynamically.

If the determination is made at block 815 that the present macro signature does not correlate with any of the zone signatures stored locally in the zone map, the method 800 may return to block 810. As discussed above, the AT 115 may continue to measure signal strengths of macro BTSs 105 on the macro network where the AT 115 is currently camped (e.g., based on thresholds, periodically, or otherwise). For example, in the event that the AT's 115 OOB radio is off at the time the method 800 is implemented, the OOB radio may not be activated. In the event that the AT's 115 OOB radio is on at the time the method 800 is implemented, the OOB radio may not be directed to look for the OOB femto-proxy (femto-proxy module 340) of the femto-proxy system 390.

In some embodiments, if the determination is made at block 815 that the present macro signature correlates with at least one of the zone signatures stored locally in the zone map, the method 800 may activate an OOB subsystem in the access terminal to detect the out-of-band femto-proxy of the femto-proxy system. For example, a Bluetooth radio in the AT 115 may be activated. In an exemplary AT 115, as described above with reference to FIG. 5A, the OOB communications subsystem 545a of the AT 115a may be activated and/or directed to look for the femto-proxy module 340 of the femto-proxy system 390.

In other embodiments, if the determination is made at block 815 that the present macro signature correlates with at least one of the zone signatures stored locally in the zone map, the method 800 may activate a WWAN subsystem in the access terminal to detect the femtocell of the femto-proxy system. For example, a WWAN radio in the AT 115 may be activated. A femtocell paging procedure may then commence by which the AT 115 may detect the FAP 230 of the femto-proxy system 390.

In some cases, having activated the OOB subsystem of the access terminal at stage 825, other functionality may be implemented. FIG. 10 shows a flow diagram of an exemplary method 1000 that continues the method 800 of FIG. 8. After activation of the OOB subsystem of the access terminal at stage 825 of FIG. 8 (shown in a dashed box for reference), the method 1000 may use the OOB subsystem of the access terminal to scan for the out-of-band femto-proxy at stage 1005.

If the scan for the OOB femto-proxy is successful at stage 1005, a further scan may be initiated at stage 1010 to detect the femtocell of the femto-proxy system 390. As described, this may involve affecting operations of the AT 115, the FAP 230, etc. For example, the FAP 230 may bloom the femtocell coverage area by increasing transmission power and/or the AT 115 may begin to search for its home (or some other registered) FAP 230. If and when the femtocell is detected by the access terminal, the access terminal may communicatively couple (e.g., attach) with the femtocell at stage 1015.

It should be appreciated that embodiments of the disclosure may be particularly suited for deployment in existing networks. For example, embodiments may be deployed with no client device provisioning and no radio access network (RAN) configuration. Moreover, in operation according to embodiments, if an OOB proximity agent is not discovered, the client device may fall back on preexisting femtocell discovery and selection techniques, if desired. For example, normal search thresholds (e.g., Sintersearch threshold) may be retained such that when macrocell signal strength drops below such a threshold (e.g., CPICH Ec/Io<Sintersearch for inter-frequency searches and CPICH Ec/Io<Sintrasearch for intra-frequency searches) the client device will search for cells to reselect even if out-of-band techniques of the client device do not detect an OOB femto-proxy. Accordingly, embodiments may aid rather than replace femtocell selection techniques.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA), or other programmable logic device (PLD), discrete gate or transistor logic, discrete hardware components or any combination thereof designed to perform functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A software module may be a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the disclosure or claims. In other words, unless a specific order of steps or actions is specified, the order and/or use of specific steps and/or actions may be modified without departing from the scope of the disclosure or claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM or other optical disk storage, magnetic disk storage or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may be a computer program product for performing the operations presented herein. For example, such a computer program product may be a computer readable medium having instructions tangibly stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

Although the present teachings and their advantages have been described in detail, it should be understood that various changes, substitutions, and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A method for femtocell discovery, the method comprising:
    detecting a plurality of macro signals at an access terminal, each macro signal associated with a macro cell corresponding to a macro identifier, the macro cells being part of a macro communications network configured to provide communications services to the access terminal;
    determining the macro identifier and a respective signal strength for each of the detected plurality of macro signals;
    calculating a present macro signature using the access terminal based on the determined macro identifiers and the respective signal strengths;
    determining that the present macro signature correlates with a particular zone signature of a plurality of zone signatures stored locally in a zone map, each zone signature representing a macro signature associated with a corresponding zone of a plurality of zones of a femtocell coverage area, the particular zone signature being associated with a femtocell; and
    triggering detection of the femtocell in response to the present macro signature correlating with the particular zone signature.

2. The method of claim 1, wherein triggering detection of the femtocell in response to the present macro signature correlating with the particular zone signature comprises at least one of:
    activating a femto communications subsystem in the access terminal; and
    initiating a scan by the femto communications subsystem in the access terminal to detect the femtocell.

3. The method of claim 1, wherein triggering detection of the femtocell in response to the present macro signature correlating with the particular zone signature comprises at least one of:
    activating an out-of-band subsystem in the access terminal; and
    initiating a scan by the out-of-band subsystem in the access terminal to detect an out-of-band femto proxy wherein the out-of-band femto-proxy is integrated with the femtocell as part of a femto-proxy system.

4. The method of claim 3, further comprising:
    initiating a scan at the access terminal to detect the femtocell of the femto-proxy system after the out-of-band femto-proxy is detected by the access terminal; and communicatively coupling the access terminal with the femtocell when the femtocell is detected by the access terminal.

5. The method of claim 3, wherein the out-of-band subsystem and the out-of-band femto-proxy are configured to communicate via a Bluetooth communications link.

6. The method of claim 1, further comprising:
communicatively coupling the access terminal with the femtocell with the access terminal located in the femtocell coverage area;
while the access terminal is communicatively coupled with the femtocell and located in the femtocell coverage area:
calculating a present beacon signature using the access terminal according to a combination of detected beacon signals originating from proximately located beacon sources;
determining a zone in which the access terminal is located, the zone being one of the plurality of zones of the femtocell coverage area corresponding to the present beacon signature; and
generating a zone signature by associating the present macro signature with the zone of the femtocell coverage area corresponding to the present beacon signature; and
updating the zone map stored locally at the access terminal with the generated zone signature.

7. The method of claim 6, wherein at least one of the beacon signals is a Bluetooth signal.

8. The method of claim 6, wherein at least one of the beacon sources is an out-of-band femto-proxy integrated with the femtocell as part of a femto-proxy system.

9. The method of claim 1, further comprising:
communicatively coupling the access terminal with the femtocell;
downloading at least one zone signature to the access terminal from a data store communicatively coupled with the femtocell; and
updating the zone map stored locally at the access terminal with the downloaded zone signature.

10. The method of claim 1, wherein
the macro signature comprises the determined macro identifiers and the respective signal strengths ordered according to the respective signal strengths.

11. The method of claim 1, wherein each macro cell is an intra-frequency, inter-frequency neighbor of the femtocell that is not a neighboring femtocell.

12. An access terminal comprising:
a data store comprising a zone map having a plurality of zone signatures, each zone signature representing a macro signature associated with a corresponding zone of a plurality of zones of a femtocell coverage area and being associated with a femtocell;
a macro communications subsystem, communicatively coupled with the data store, and configured to:
detect a plurality of macro signals, each macro signal associated with a macro cell corresponding to a macro identifier, the macro cells being part of a macro communications network;
determine the macro identifier and a respective signal strength for each of the detected plurality of macro signals;
calculate a present macro signature based on the determined macro identifiers and the respective signal strengths; and
determine that the present macro signature correlates with a particular zone signature of the plurality of zone signatures; and a femto communications subsystem, communicatively coupled with the macro communications subsystem, and configured to:
trigger detection of the femtocell in response to the present macro signature correlating with the particular zone signature; and
become available for communications with the femtocell when the femtocell is detected.

13. The access terminal of claim 12, wherein the femto communications subsystem is configured to trigger detection of the femtocell in response to the present macro signature correlating with the particular zone signature by initiating a scan for the femtocell over a wireless wide area network (WWAN) link.

14. The access terminal of claim 12, further comprising:
an out-of-band (OOB) communications subsystem, communicatively coupled with the femto communications subsystem, wherein
the femto communications subsystem is configured to trigger detection of the femtocell in response to the present macro signature correlating with the particular zone signature by at least one of:
activating the OOB communications subsystem; and
initiating a scan by the OOB communications subsystem to detect an OOB femto-proxy wherein the OOB femto proxy is integrated with the femtocell as part of a femto-proxy system.

15. The access terminal of claim 14, the femto communications subsystem further configured to:
initiate a scan to detect the femtocell of the femto-proxy system after the out-of-band femto-proxy is detected by the OOB communications subsystem; and
establish a communications link between the access terminal and the femtocell when the femtocell is detected.

16. The access terminal of claim 12, further comprising:
a zone mapping subsystem, configured to:
detect beacon signals originating from proximately located beacon sources when the femto communications subsystem is communicatively coupled with the femtocell while located in the femtocell coverage area;
calculate a current beacon signature according to a combination of the detected beacon signals;
determine a zone of the femtocell coverage area corresponding to the current beacon signature;
receive the present macro signature from the macro communications subsystem;
generate a zone signature by associating the received present macro signature with the zone of the femtocell coverage area corresponding to the current beacon signature; and
update the zone map according to the generated zone signature.

17. The access terminal of claim 16, wherein at least one of the beacon signals is a Bluetooth signal.

18. The access terminal of claim 16, wherein at least one of the beacon sources is an out-of-band femto-proxy integrated with the femtocell as part of a femto-proxy system.

19. The access terminal of claim 12, further comprising:
a zone mapping subsystem, configured to:
download at least one zone signature to the access terminal from a data store communicatively coupled with the femtocell; and
update the zone map according to the downloaded zone signature.

20. The access terminal of claim 12,
wherein the macro signature comprises the determined macro identifiers and the respective signal strengths ordered according to the respective signal strengths.

21. A processor for femtocell discovery in an access terminal, the processor comprising:
a macro communications controller configured to:
detect a plurality of macro signals, each associated with a macro cell corresponding to a macro identifier, the macro cells being part of a macro communications network;
determine the macro identifier and a respective signal strength for each of the detected plurality of macro signals;
calculate a present macro signature based on the determined macro identifiers and the respective signal strengths; and
determine that the present macro signature correlates with a particular zone signature of a plurality of zone signatures stored in a zone map, each zone signature representing a macro signature associated with a corresponding zone of a plurality of zones of a femtocell coverage area, the particular zone signature being associated with a femtocell;
a femto communications controller, communicatively coupled with the macro communications controller, and configured to:
trigger detection of the femtocell in response to the present macro signature correlating with the particular zone signature; and
become available for communications with the femtocell when the femtocell is detected.

22. The processor of claim 21, wherein the femto communications controller is configured to trigger detection of the femtocell in response to the present macro signature correlating with the particular zone signature by initiating a scan for the femtocell over a wireless wide area network (WWAN) link.

23. The processor of claim 21, further comprising:
an out-of-band (OOB) communications controller, communicatively coupled with the femto communications controller,
wherein the femto communications controller is configured to
trigger detection of the femtocell in response to the present macro signature correlating with the particular zone signature by at least one of:
activating the OOB communications subsystem; and
initiating a scan to detect an OOB femto-proxy wherein the OOB femto proxy is integrated with the femtocell as part of a femto-proxy system.

24. The processor of claim 23, the femto communications controller further configured to:
initiate a scan to detect the femtocell of the femto-proxy system after the out-of-band femto-proxy is detected by the out-of-band communications controller; and
establish a communications link between the access terminal and the femtocell when the femtocell is detected.

25. The processor of claim 21, further comprising:
a zone mapping controller, configured to:
detect beacon signals originating from proximately located beacon sources when the femto communications controller is communicatively coupled with the femtocell while located in the femtocell coverage area;
calculate a current beacon signature according to a combination of the detected beacon signals;
determine a zone of the femtocell coverage area corresponding to the current beacon signature;
receive the present macro signature from the macro communications controller;
generate a zone signature by associating the received present macro signature with the zone of the femtocell coverage area corresponding to the current beacon signature; and
update the zone map according to the generated zone signature.

26. The processor of claim 21, further comprising:
a zone mapping controller, configured to:
download at least one zone signature to the access terminal from a data store communicatively coupled with the femtocell; and
update the zone map according to the downloaded zone signature.

27. The processor of claim 21,
wherein the macro signature comprises the determined macro identifiers and the respective signal strengths ordered according to the respective signal strengths.

28. A computer program product residing on a non-transitory processor-readable medium and comprising processor-readable instructions, which, when executed, cause a processor to perform steps comprising:
detecting a plurality of macro signals at an access terminal, each macro signal associated with a macro cell corresponding to a macro identifier, the macro cells being part of a macro communications network configured to provide communications services to the access terminal;
determining the macro identifier and a respective signal strength for each of the detected plurality of macro signals;
calculating a present macro signature using the access terminal based on the determined macro identifiers and the respective signal strengths;
determining that the present macro signature correlates with a particular zone signature of a plurality of zone signatures stored locally in a zone map, each zone signature representing a macro signature associated with a corresponding zone of a plurality of zones of a femtocell coverage area, the particular zone signature being associated with a femtocell; and
triggering detection of the femtocell in response to the present macro signature correlating with the particular zone signature.

29. The computer program product of claim 28, wherein triggering detection of the femtocell in response to the present macro signature correlating with the particular zone signature comprises at least one of:
activating a wireless wide area network (WWAN) in the access terminal; and
initiating a scan by the WWAN in the access terminal to detect the femtocell.

30. The computer program product of claim 28, wherein triggering detection of the femtocell in response to the present macro signature correlating with the particular zone signature comprises at least one of:
activating an out-of-band subsystem in the access terminal; and
initiating a scan by the out-of-band subsystem in the access terminal to detect an out-of-band femto proxy wherein the out-of-band femto-proxy is integrated with the femtocell as part of a femto-proxy system.

31. The computer program product of claim 30, the processor-readable instructions, when executed, causing a processor to perform steps further comprising:
- initiating a scan at the access terminal to detect the femtocell after the out-of-band femto-proxy is detected by the access terminal; and
- communicatively coupling the access terminal with the femtocell when the femtocell is detected by the access terminal.

32. The computer program product of claim 28, the processor-readable instructions, when executed, causing a processor to perform steps further comprising:
- communicatively coupling the access terminal with the femtocell when the access terminal is located in the femtocell coverage area;
- while the access terminal is communicatively coupled with the femtocell and located in the femtocell coverage area:
  - calculating a present beacon signature using the access terminal according to a combination of detected beacon signals originating from proximately located beacon sources;
  - determining a zone in which the access terminal is located, the zone being one of the plurality of zones of the femtocell coverage area corresponding to the present beacon signature;
  - generating a zone signature by associating the present macro signature with the zone of the femtocell coverage area corresponding to the present beacon signature; and
  - updating the zone map stored locally at the access terminal with the generated zone signature.

33. The computer program product of claim 28, the processor-readable instructions, when executed, causing a processor to perform steps further comprising:
- communicatively coupling the access terminal with the femtocell;
- downloading at least one zone signature to the access terminal from a data store communicatively coupled with the femtocell; and
- updating the zone map stored locally at the access terminal with the downloaded zone signature.

34. The computer program product of claim 28, wherein the macro signature comprises the determined macro identifiers and the respective signal strengths ordered according to the respective signal strengths.

35. A system for femtocell discovery comprising:
- means for detecting a plurality of macro signals at an access terminal, each macro signal associated with a macro cell corresponding to a macro identifier, the macro cells being part of a macro communications network configured to provide communications services to the access terminal;
- means for determining the macro identifier and a respective signal strength for each of the detected plurality of macro signals;
- means for calculating a present macro signature using the access terminal based on the determined macro identifiers and the respective signal strengths;
- means for determining that the present macro signature correlates with a particular zone signature of a plurality of zone signatures stored locally in a zone map, each zone signature representing a macro signature associated with a corresponding zone of a plurality of zones of a femtocell coverage area, the particular zone signature being associated with a femtocell; and
- means for triggering detection of the femtocell in response to the present macro signature correlating with the particular zone signature.

36. The system of claim 35, wherein the means for triggering detection of the femtocell in response to the present macro signature correlating with the particular zone signature comprises at least one of:
- means for activating a wireless wide area network (WWAN) in the access terminal; and
- means for initiating a scan by the WWAN in the access terminal to detect the femtocell.

37. The system of claim 35, wherein the means for triggering detection of the femtocell in response to the present macro signature correlating with the particular zone signature comprises at least one of:
- means for activating an out-of-band subsystem in the access terminal; and
- means for initiating a scan by the out-of-band subsystem in the access terminal to detect an out-of-band femto proxy wherein the out-of-band femto-proxy is integrated with the femtocell as part of a femto-proxy system.

38. The system of claim 37, further comprising:
- means for initiating a scan at the access terminal to detect the femtocell of the femto-proxy system after the out-of-band femto-proxy is detected by the access terminal; and
- means for communicatively coupling the access terminal with the femtocell when the femtocell is detected by the access terminal.

39. The system of claim 35, further comprising:
- means for communicatively coupling the access terminal with the femtocell when the access terminal is located in the femtocell coverage area;
- while the access terminal is communicatively coupled with the femtocell and located in the femtocell coverage area:
  - means for calculating a present beacon signature using the access terminal according to a combination of detected beacon signals originating from proximately located beacon sources;
  - means for determining a zone in which the access terminal is located, the zone being one of the plurality of zones of the femtocell coverage area corresponding to the present beacon signature; and
  - means for generating a zone signature by associating the present macro signature with the zone of the femtocell coverage area corresponding to the present beacon signature; and
- means for updating the zone map stored locally at the access terminal with the generated zone signature.

40. The system of claim 35, further comprising:
- means for communicatively coupling the access terminal with the femtocell;
- means for downloading at least one zone signature to the access terminal from a data store communicatively coupled with the femtocell; and
- means for updating the zone map stored locally at the access terminal with the downloaded zone signature.

41. The system of claim 35, wherein
the macro signature comprises the determined macro identifiers and the respective signal strengths ordered according to the respective signal strengths.

* * * * *